(12) United States Patent  
Uchida et al.

(10) Patent No.: US 9,804,277 B2  
(45) Date of Patent: Oct. 31, 2017

(54) RADIATION DETECTOR

(71) Applicant: HAMAMATSU PHOTONICS K.K., Hamamatsu-shi, Shizuoka (JP)

(72) Inventors: Hiroshi Uchida, Hamamatsu (JP); Hidemoto Yamauchi, Hamamatsu (JP); Kento Hakamata, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/008,796

(22) Filed: Jan. 28, 2016

(65) Prior Publication Data

US 2016/0223684 A1 Aug. 4, 2016

(30) Foreign Application Priority Data

Jan. 30, 2015 (JP) .................. 2015-016945  
Jan. 22, 2016 (JP) .................. 2016-010781

(51) Int. Cl.  
*G01T 1/20* (2006.01)

(52) U.S. Cl.  
CPC .................. *G01T 1/2008* (2013.01)

(58) Field of Classification Search  
CPC ..... G01T 1/202; G01T 1/2002; G01T 1/1644; G01T 1/2008  
See application file for complete search history.

(56) References Cited

U.S. PATENT DOCUMENTS 4,394,576 A * 7/1983 Tanaka .................. G01T 1/1642  
250/363.02

FOREIGN PATENT DOCUMENTS

| JP | 3597979 B2 | 12/2004 |
| JP | 3697340 B2 | 9/2005 |
| JP | 2007-093376 A | 4/2007 |
| JP | 4332613 B2 | 9/2009 |
| JP | 4338177 B2 | 10/2009 |
| JP | 5013864 B2 | 8/2012 |
| JP | WO2012/105292 A1 | 8/2012 |
| WO | WO-2012/105292 A1 | 8/2012 |

* cited by examiner

*Primary Examiner* — David Porta  
*Assistant Examiner* — Faye Boosalis  
(74) *Attorney, Agent, or Firm* — Drinker Biddle & Reath LLP

(57) ABSTRACT

In a radiation detector, a first segment positioned closest to the other side in a predetermined direction and a second segment positioned closest to the other side in the predetermined direction are optically connected to each other, and the first segments other than the first segment positioned closest to the other side in the predetermined direction and the second segments other than the second segment positioned closest to the other side in the predetermined direction are optically separated from each other.

5 Claims, 27 Drawing Sheets

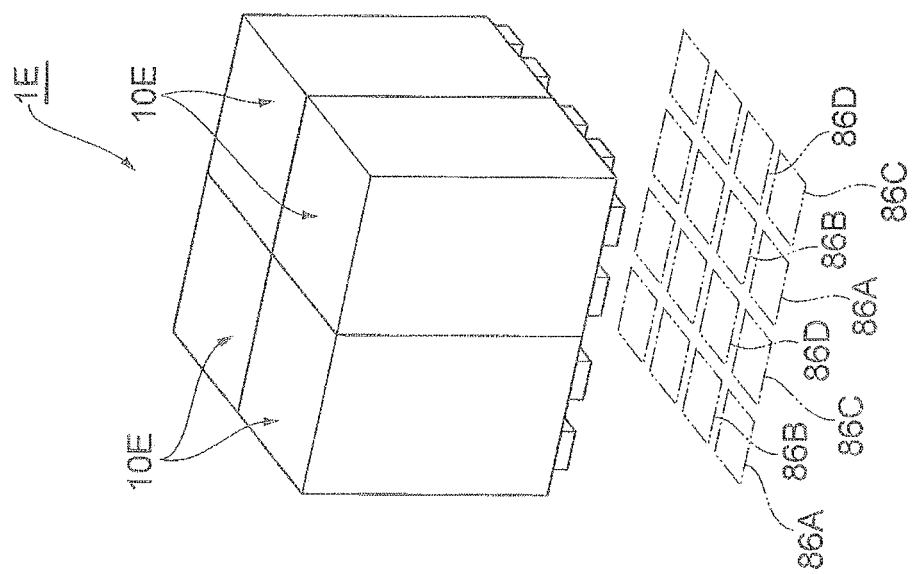
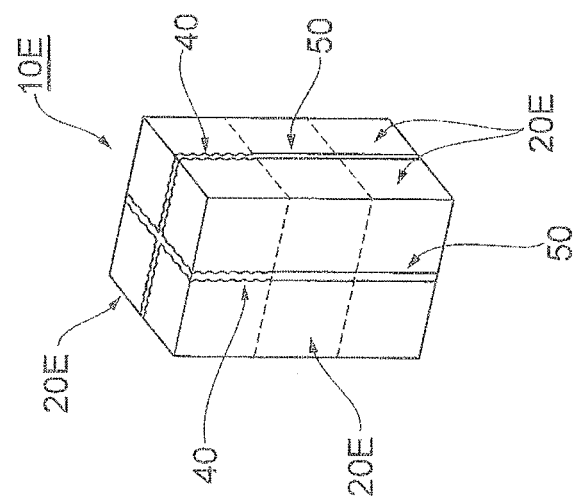

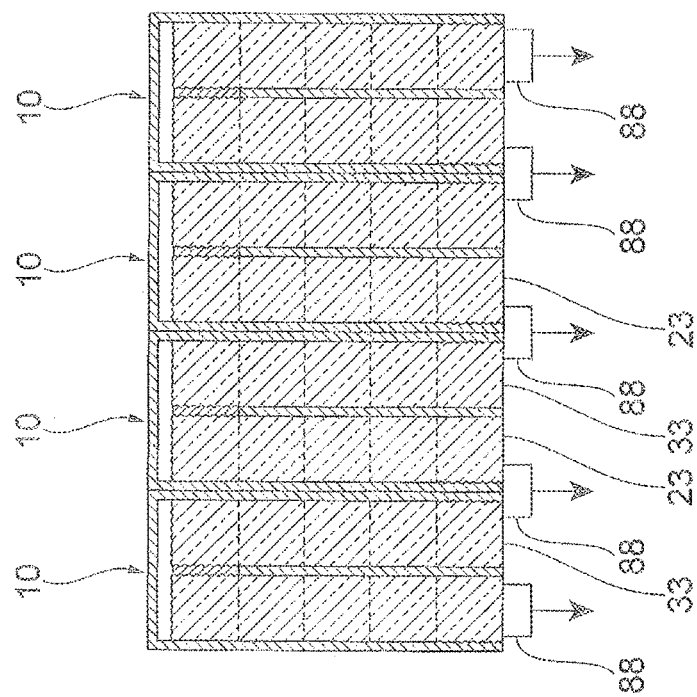
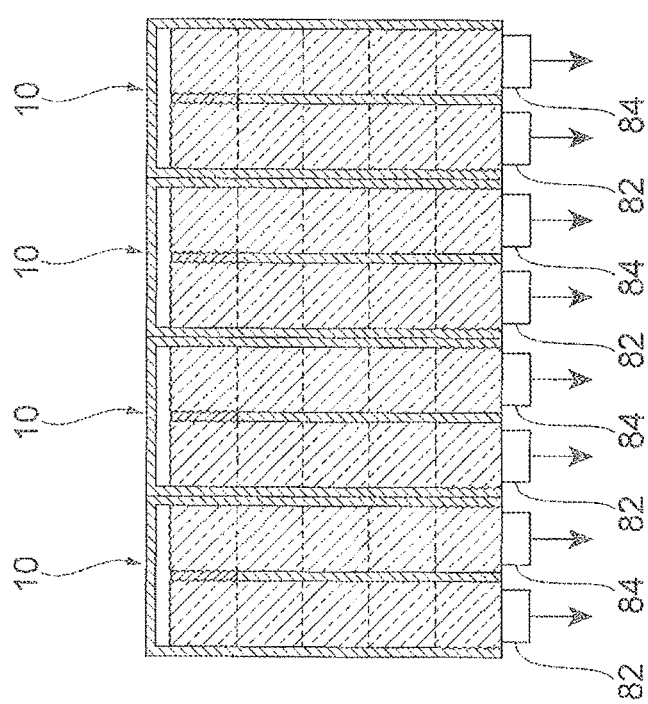

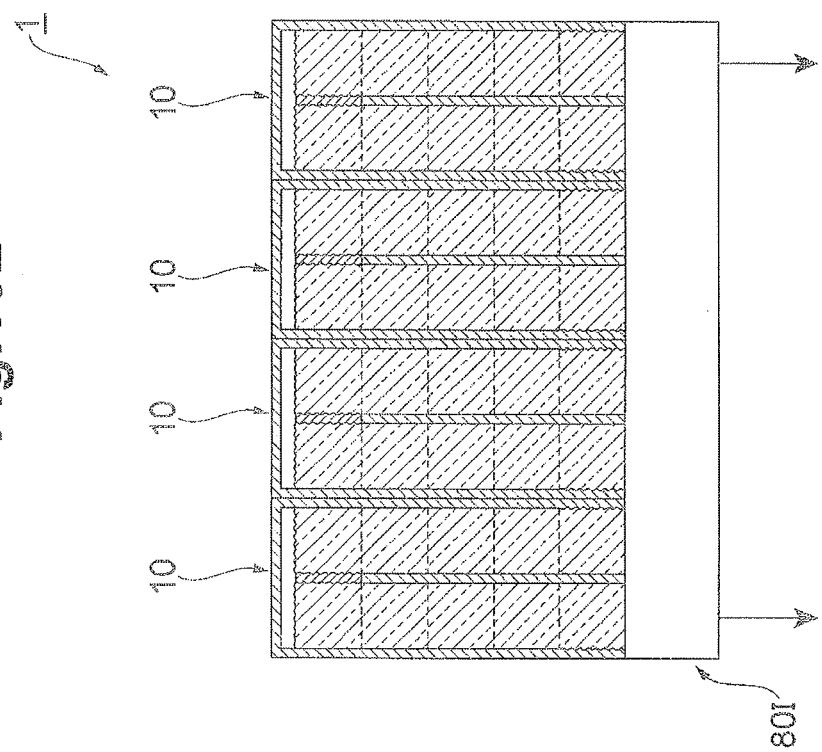
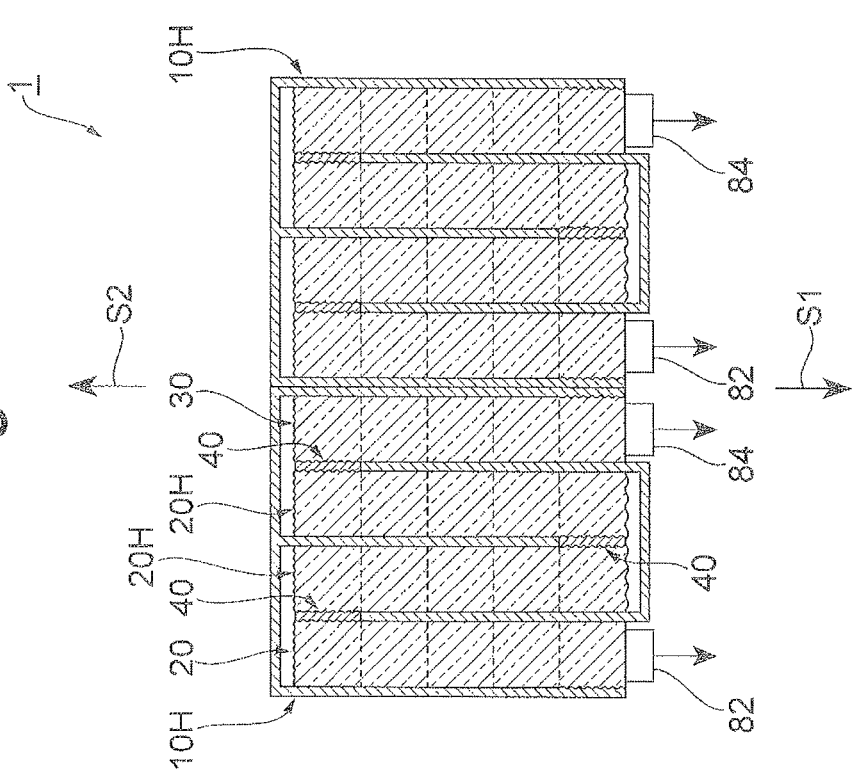

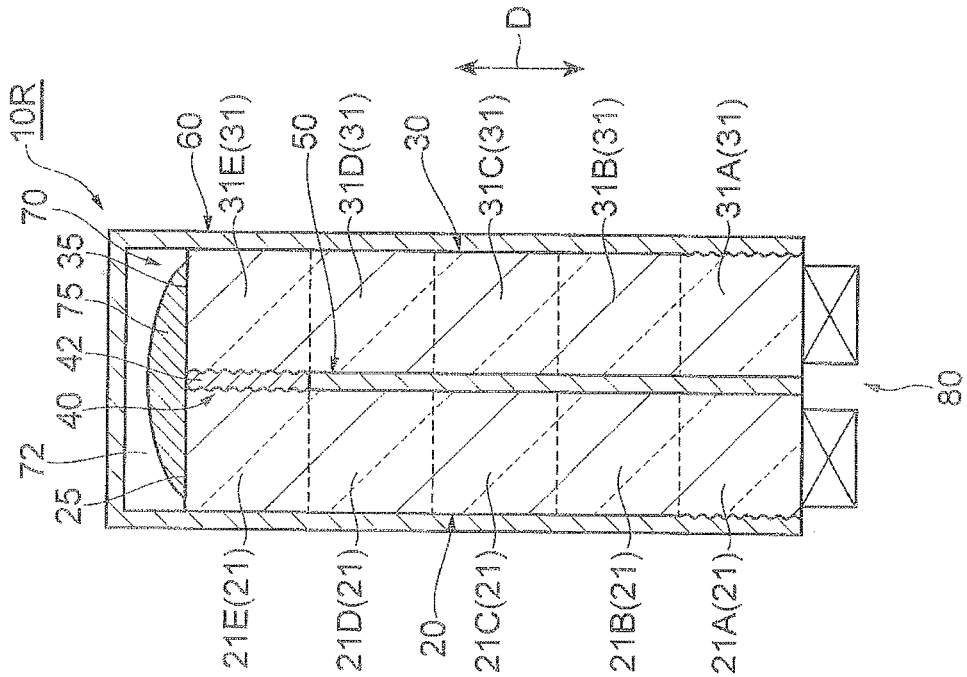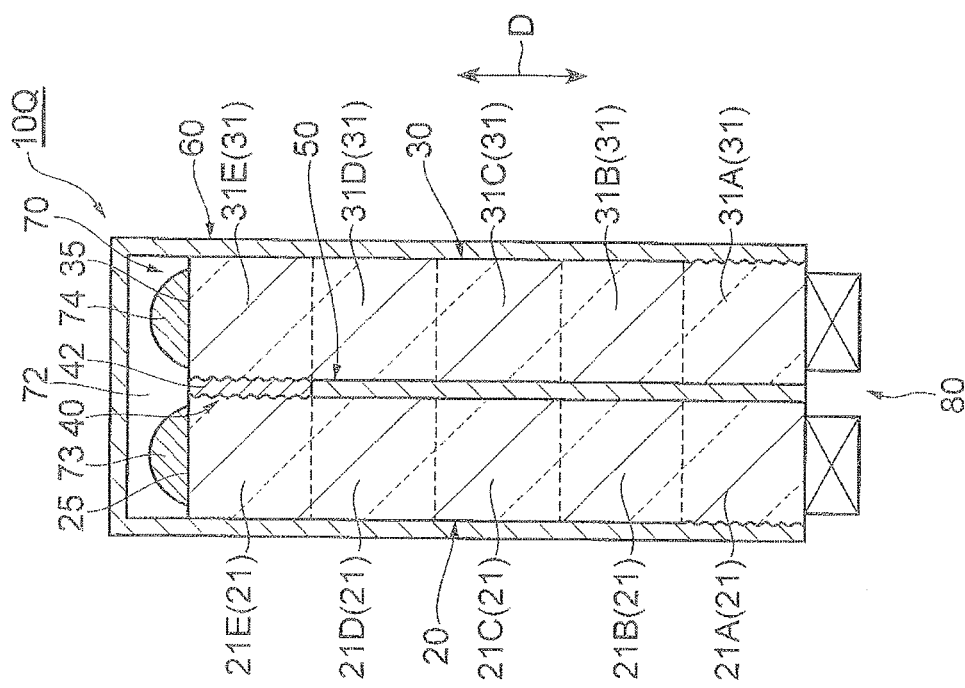

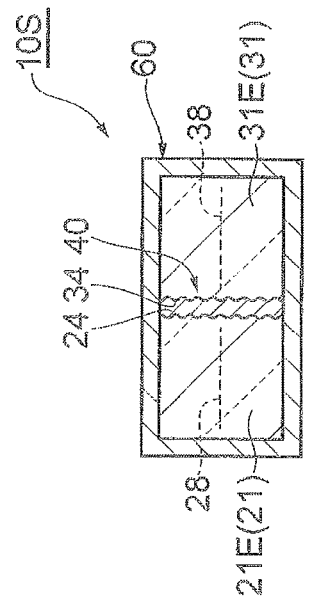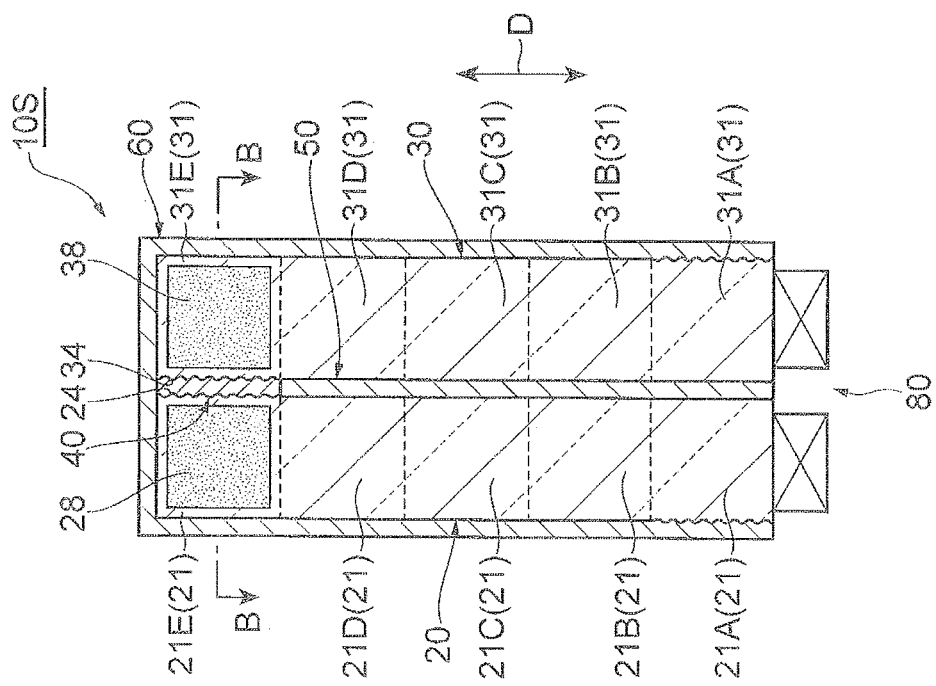

RADIATION DETECTOR

TECHNICAL FIELD

An aspect of the present invention relates to a radiation detector.

BACKGROUND

A radiation detector which includes a scintillator portion having a plurality of segments, and a light detection unit which detects scintillation light at a plurality of portions of the scintillator portion is known (for example, Japanese Unexamined Patent Publication No. 2007-93376, Japanese Patent No. 4332613, Japanese Patent No. 4338177, Japanese Patent No. 3597979, Japanese Patent No. 3697340, Japanese Patent No. 5013864, and WO 2012/105292 A). In the radiation detector, the segment which absorbs radiation is specified by the detection values of the scintillation light at the plurality of portions of the scintillator portion.

SUMMARY

There is a demand of the radiation detector like described above for ease of manufacturing, high accuracy, and ease of mounting on an apparatus such as a positron emission tomography (PET) apparatus.

An object of an aspect of the present invention is to provide a radiation detector which achieves ease of manufacturing, high accuracy, and ease of mounting on an apparatus.

According to an aspect of the present invention, a radiation detector includes: a first scintillator portion including a plurality of first segments arranged along a predetermined direction, and a first light scattering portion formed between the first segments adjacent to each other through laser irradiation; a second scintillator portion including a plurality of second segments arranged along the predetermined direction, and a second light scattering portion formed between the second segments adjacent to each other through laser irradiation; and a light detection unit optically connected to a first end surface of the first segment positioned closest to one side in the predetermined direction, and a second end surface of the second segment positioned closest to the one side in the predetermined direction. The first segment positioned closest to the other side in the predetermined direction and the second segment positioned closest to the other side in the predetermined direction are optically connected to each other. The first segments other than the first segment positioned closest to the other side in the predetermined direction and the second segments other than the second segment positioned closest to the other side in the predetermined direction are optically separated from each other.

In the radiation detector, by forming the first light scattering portion between the first segments adjacent to each other through laser irradiation, the first scintillator portion is obtained. Similarly, by forming the second light scattering portion between the second segments adjacent to each other through laser irradiation, the second scintillator portion is obtained. Therefore, for example, compared to a case where a plurality of scintillator blocks are joined to each other while allowing light scattering members to be interposed therebetween, the first scintillator portion and the second scintillator portion can be obtained easily and with high dimensional accuracy. In addition, in the radiation detector, the light detection unit is optically connected to the first end surface of the first segment positioned closest to the one side in the predetermined direction and the second end surface of the second segment positioned closest to the one side in the predetermined direction. Therefore, electrical connection to the light detection unit can be performed from the one side in the predetermined direction. As described above, in the radiation detector, ease of manufacturing, high accuracy, and ease of mounting on an apparatus are achieved. It is thought that it is not possible to generally specify the structure or characteristics regarding the difference between the light scattering portions formed through laser irradiation and light scattering portions formed by joining the plurality of scintillator blocks together while allowing the light scattering members to be interposed therebetween, through words. In addition, it is thought that it is also not possible or is not practical to analyze or specify the structure or characteristics on the basis of measurement.

According to an aspect of the present invention, the radiation detector may further include a light reflection portion disposed between the first segments other than the first segment positioned closest to the other side in the predetermined direction and the second segments other than the second segment positioned closest to the other side in the predetermined direction. Accordingly, predetermined optical separation can be easily and reliably realized.

According to an aspect of the present invention, in the radiation detector, a plurality of radiation detection units, each of which includes the first scintillator portion, the second scintillator portion, and the light detection unit, may be configured, the light detection unit may include a first light detection portion optically connected to the first end surface, and a second light detection portion optically connected to the second end surface, and the first light detection portion of each of the plurality of radiation detection units may be connected to a first resistor chain, and the second light detection portion of each of the plurality of radiation detection units may be connected to a second resistor chain. In a configuration in which light detection portions of a plurality of radiation detection units are connected to a resistor chain and outputs are extracted from both ends of the resistor chain, compared to a case where an output is separately extracted from each of light detection portions, the number of outputs can be reduced. However, for example, when all of the light detection portions of the plurality of radiation detection units are connected to a single resistor chain, the number of segments to be discriminated on the basis of the extracted outputs is increased, and there is concern that a characteristic of discrimination between the segments may be degraded. Contrary to this, in the radiation detector, between the plurality of radiation detection units, the first light detection portions are connected to the first resistor chain, and the second light detection portions are connected to the second resistor chain. Accordingly, by an operation based on outputs from both ends of the first resistor chain and/or outputs from both ends of the second resistor chain, and an operation based on the sum of the outputs from both ends of the first resistor chain and the sum of the outputs from both ends of the second resistor chain, the specification of the radiation detection unit where scintillation light is generated, and the specification of the segment where scintillation light is generated, can be separately performed. Therefore, a good characteristic of discrimination between the segments can be ensured while reducing the number of outputs.

According to an aspect of the present invention, the radiation detector may further include a light guide portion which, in a case where the first segment positioned closest to the other side in the predetermined direction and the second segment positioned closest to the other side in the predetermined direction are optically coupled to each other, optically connects the first segment and the second segment to each other. In a case where the surfaces the first segment and the second segment are optically coupled to each other by an air layer or an optical coupling agent, the passage amount of scintillation light is limited by reflection on a connection portion. Therefore, as the separation between the segments in the discrimination characteristic is increased, the separation between the other segments is reduced, and there is concern that the characteristic of discrimination between the overall segments may be degraded. From this viewpoint, in the radiation detector, the passage amount of scintillation light between such segments is increased by the light guide portion. Therefore, the characteristic of discrimination between the segments can be enhanced.

According to an aspect of the present invention, in the radiation detector, a first region including at least a portion of a surface of the first segment positioned closest to the one side in the predetermined direction excluding the first end surface, and a second region including at least a portion of a surface of the second segment positioned closest to the one side in the predetermined direction excluding the second end surface may be formed as diffuse reflection regions, and a surface of the plurality of first segments other than the first end surface and the first region, and a surface of the plurality of second segments other than the second end surface and the second region may be formed as specular reflection regions. The first segment positioned closest to the one side in the predetermined direction and the first segment adjacent to the corresponding first segment have similar characteristics of outputs extracted in a case where scintillation light is generated (the ratio of outputs from both ends), and thus the discrimination therebetween is relatively difficult. Contrary to this, in the radiation detector, since the diffuse reflection region is provided on the surface of the first segment positioned closest to the one side in the predetermined direction, the characteristics of the outputs extracted in a case where scintillation light is generated (the ratio of outputs from both ends) can be differentiated between the corresponding first segment and the first segment adjacent to the corresponding first segment. Therefore, the characteristic of discrimination between the first segments can be enhanced. Similarly, since the diffuse reflection region is provided on the surface of the second segment positioned closest to the one side in the predetermined direction, the characteristic of discrimination between the corresponding second segment and the second segment adjacent to the corresponding second segment can be enhanced.

BRIEF DESCRIPTION OF THE DRAWINGS

FIGS. 11A and 11B are perspective views of a sixth modification example of the radiation detector of FIG. 1.
FIGS. 12A and 12B are sectional views of a seventh modification example and an eighth modification example of the radiation detector of FIG. 1.
FIGS. 13A and 13B are sectional views of a ninth modification example and a tenth modification example of the radiation detector of FIG. 1.
FIGS. 22A and 22B are sectional views of a fifteenth modification example and a sixteenth modification example of the radiation detector of FIG. 2.
FIG. 23A is a sectional view of a seventeenth modification example of the radiation detector of FIG. 2,
and FIG. 23B is a sectional view taken along line B-B of FIG. 22A.

DETAILED DESCRIPTION

Figure 1:
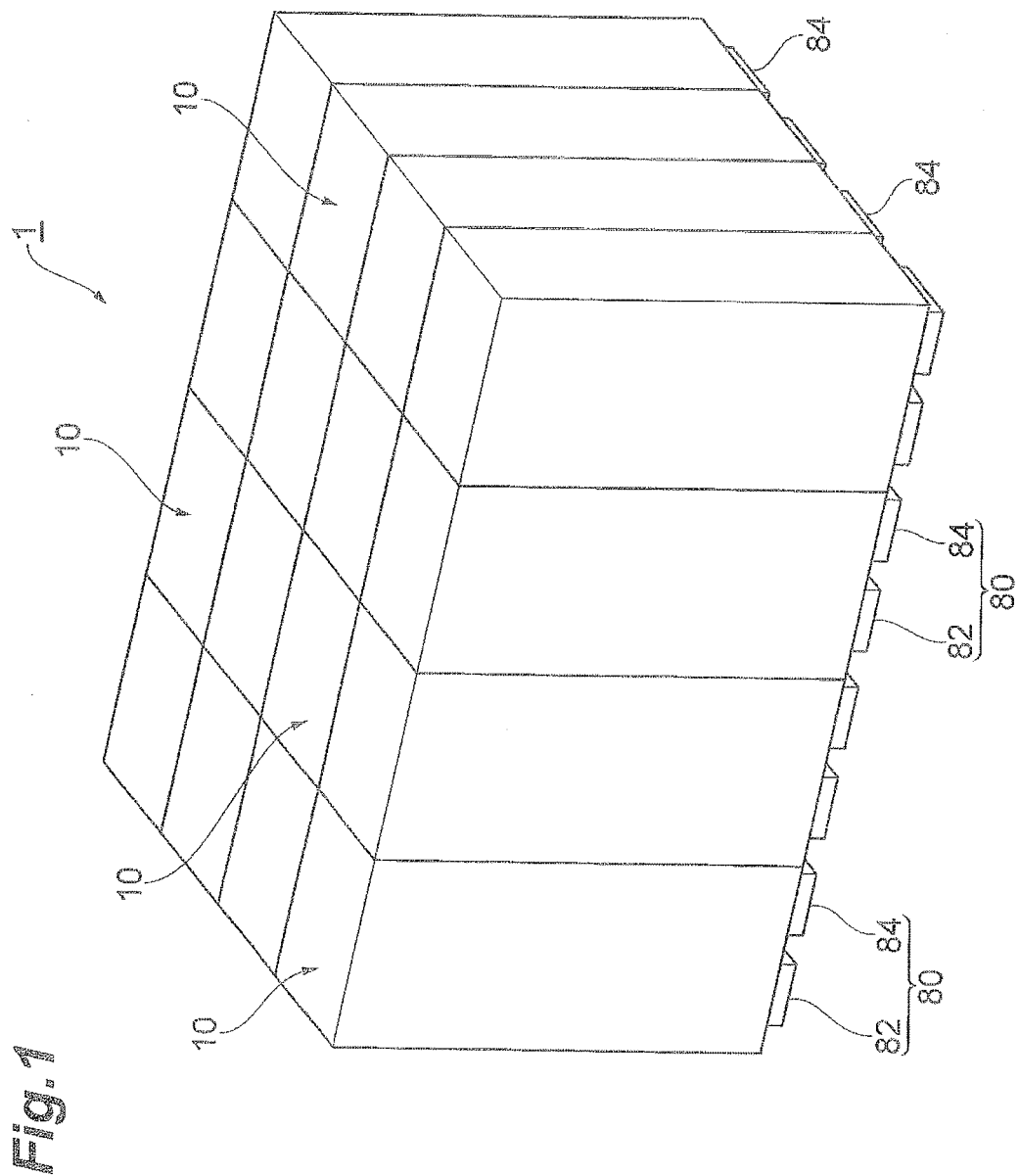
FIG. 1 is a perspective view of a radiation detector of an embodiment of the present invention.

Hereinafter, an embodiment according to the present invention will be described in detail with reference to the drawings. In the following description, like elements which are the same or similar to each other are denoted by like reference numerals, and overlapping description will not be repeated.

As illustrated in FIG. 1, a radiation detector 1 includes a plurality of radiation detection units 10. The plurality of radiation detection units 10 are two-dimensionally arranged. In this example, the plurality of radiation detection units 10 are arranged in a matrix form having four rows and four columns. The adjacent radiation detection units 10 are integrated with each other, for example, by adhesion to be fixed to each other.

Figure 2:
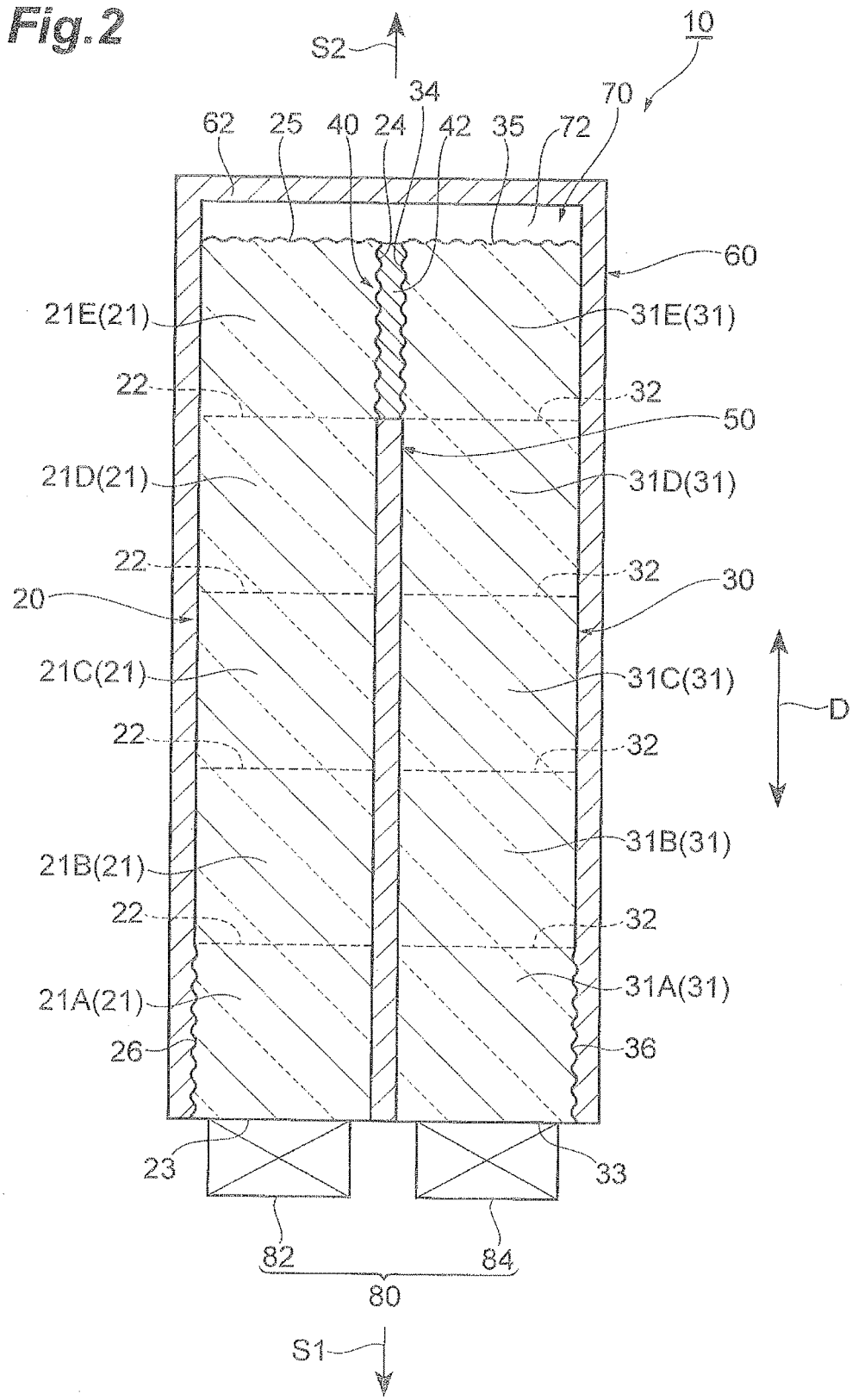
FIG. 2 is a sectional view of a radiation detection unit of the radiation detector of FIG. 1.

As illustrated in FIG. 2, the radiation detection unit 10 includes a first scintillator portion 20, a second scintillator portion 30, light reflection portions 50 and 60, and a light detection unit 80. Each of the scintillator portions 20 and 30 is formed of a crystal body which absorbs radiation, such as gamma rays, that is incident from the outside, and generates scintillation light. Each of the scintillator portions 20 and 30 generates scintillation light having an intensity corresponding to the dose of the absorbed radiation at a position where the radiation is absorbed. The crystal body is formed of a crystal such as $Bi_4Ge_3O_{12}$ (BGO), $Lu_2SiO_5$ (LSO) doped with Ce, $Lu_{2(1-x)}Y_{2x}SiO_5$ (LYSO), $Gd_2SiO_5$ (GSO), LuAG ($Lu_3Al_5O_{12}$) doped with Pr, $LaBr_3$ ($LaBr_3$) doped with Ce, $LaCl_3$ ($LaCl_3$) doped with Ce, $Lu_{0.7}Y_{0.3}AlO_3$ (LuYAP) doped with Ce, or lutetium fine silicate (LFS).

The first scintillator portion 20 has, for example, a regular prism shape. The first scintillator portion 20 includes a plurality of first segments 21 arranged along a predetermined direction D, and first light scattering portions 22 provided between the adjacent first segments 21. That is, the first scintillator portion 20 is divided into the plurality of (in this example, five) first segments 21 by a plurality of (in this example, four) first light scattering portions 22. The first segment 21 has, for example, a cubic shape. Hereinafter, the five first segments 21 arranged from one side S1 to the other side S2 in the direction D are referred to as a first segment 21A, a first segment 21B, a first segment 21C, a first segment 21D, and a first segment 21E.

The first light scattering portion 22 allows a portion of the scintillation light that is incident onto the corresponding first light scattering portion 22 to be scattered and thus attenuates the intensity of the scintillation light that passes through the corresponding first light scattering portion 22. The first light scattering portion 22 has, for example, a flat surface shape perpendicular to the direction D. More specifically, the first light scattering portion 22 has, for example, the same shape (in this example, a square shape) as a first end surface 23 of the first segment 21A (a surface on the one side S1 in the direction D). For example, the plurality of first light scattering portions 22 are arranged to have the same interval therebetween in the direction D and overlap each other when viewed in the direction D.

The second scintillator portion 30 has, for example, a regular prism shape. The second scintillator portion 30 includes a plurality of second segments 31 arranged along the direction D, and second light scattering portions 32 provided between the adjacent second segments 31. That is, the second scintillator portion 30 is divided into the plurality of (in this example, five) second segments 31 by a plurality of (in this example, four) second light scattering portions 32. The second segment 31 has, for example, a cubic shape. Hereinafter, the five second segments 31 arranged from the one side S to the other side S2 in the direction D are referred to as a second segment 31A, a second segment 31B, a second segment 31C, a second segment 31D, and a second segment 31E.

The second light scattering portion 32 allows a portion of the scintillation light that is incident onto the corresponding second light scattering portion 32 to be scattered and thus attenuates the intensity of the scintillation light that passes through the corresponding second light scattering portion 32. The second light scattering portion 32 has, for example, a flat surface shape perpendicular to the direction D. More specifically, the second light scattering portion 32 has, for example, the same shape (in this example, a square shape) as a second end surface 33 of the second segment 31A (a surface on the one side S1 in the direction D). For example, the plurality of second light scattering portions 32 are arranged to have the same interval therebetween in the direction D and overlap each other when viewed in the direction D.

Each of the light scattering portions 22 and 32 is formed by reforming (for example, amorphizing) a portion of the crystal body forming each of the scintillator portions 20 and 30. The reforming is performed by laser light irradiation. More specifically, laser light having a light-transmitting property is focused on the crystal body forming each of the scintillator portions 20 and 30 and the focal point of the laser light is relatively moved along a predetermined surface of the crystal body. Accordingly, light absorption is caused at a portion, in the crystal body, that is coincident with the focal point of the laser light such that a reformed region is formed along the predetermined surface of the crystal body. In a case where the laser light is pulsed laser light, a single reformed spot is formed by the irradiation of a single pulse of laser light. As a plurality of reformed spots are arranged along the predetermined surface of the crystal body, a reformed region is formed. The reformed region formed as described above acts as each of the light scattering portions 22 and 32. That is, each of the light scattering portions 22 and 32 is formed through laser irradiation.

The reformed spot does not block or absorb scintillation light. Therefore, even when the reformed spot is formed over the entire surface of the first light scattering portion 22, a portion of the incident scintillation light is transmitted. Each of the light scattering portions 22 and 32 formed as described above has a property of having a varying scintillation light transmittance depending on the angle of incident of the scintillation light. For example, in a case where the scintillation light is vertically incident onto each of the light scattering portions 22 and 32, most of the incident scintillation light is transmitted. On the other hand, as the angle of incidence of the scintillation light is increased, the transmittance is decreased compared to a case where the scintillation light is vertically incident.

The first scintillator portion 20 and the second scintillator portion 30 configured as described above are arranged so that the first segments 21A to 21E and the second segments 31A to 31E are adjacent to each other and the first light scattering portions 22 and the second light scattering portions 32 are adjacent to each other in a direction perpendicular to the direction D. In this state, the first segment 21E and the second segment 31E positioned closest to the other side S2 in the direction D are optically connected to each other via a connection portion 40. In this example, a surface 24 of the first segment 21E on the second scintillator portion 30 side, and a surface 34 of the second segment 31E on the first scintillator portion 20 side are roughly-polished surfaces. An optical coupling agent 42 fills a space between the surfaces 24 and 34 and is solidified, thereby the first segment 21E and the second segment 31E are bonded to each other and optically coupled to each other. That is, the first segment 21E and the second segment 31E are optically connected to each other between the adjacent boundary surfaces (that is, the surfaces 24 and 34 that face each other).

The connection portion 40 is constituted by the surfaces 24 and 34 formed as the roughly-polished surfaces, and the optical coupling agent 42. By the connection portion 40, scintillation light can be allowed to pass between the first segment 21E and the second segment 31E. Even in the connection portion 40, the surfaces 24 and 34 are formed as the roughly-polished surfaces. Accordingly, compared to a case of mirror-like surfaces, reflection of the scintillation light that passes through the connection portion 40 is suppressed, and the passage amount thereof is increased. As the optical coupling agent 42, for example, room temperature vulcanizing (RTV) rubber, optical grease, silicone oil, or the like can be used.

In the first scintillator portion 20 and the second scintillator portion 30, the first segments 21A to 21D excluding the first segment 21E, and the second segments 31A to 31D excluding the second segment 31E are optically separated from each other by the light reflection portion 50. The light reflection portion 50 is disposed between the first segments 21A to 21D and the second segments 31A to 31D. The light reflection portion 50 is a film-like reflective member, and comes into contact with the first segments 21A to 21D and the second segments 31A to 31D. The surface of the light reflection portion 50 is a specular reflection surface to specularly reflect the scintillation light that is incident onto the surface. Accordingly, the surfaces (smooth surfaces) of the first segments 21A to 21D and the second segments 31A to 31D which come into contact with the light reflection portion 50 act as specular reflection regions. The light reflection portion 50 is formed of a material such as a Teflon tape (Teflon is a registered trademark), barium sulfate, aluminum oxide, titanium oxide, an enhanced specular reflector (ESR) film, or a polyester film.

The outer surfaces of the first scintillator portion 20 and the second scintillator portion 30 are covered with the light reflection portion 60. The light reflection portion 60 covers, among the outer surfaces of the first scintillator portion 20 and the second scintillator portion 30, the outer surfaces excluding the first end surface 23 of the first segment 21A and the second end surface 33 of the second segment 31A. The light reflection portion 60 is a film-like reflective member. The light reflection portion 60 is separated from the surface 25 of the first segment 21E (the surface on the other side S2 in the direction D) and the surface 35 of the second segment 31E (the surface on the other side S2 in the direction D), and comes into contact with the outer surfaces excluding the surfaces 25 and 35. The surface of the light reflection portion 60 is a specular reflection surface to specularly reflect the scintillation light that is incident onto the surface. Accordingly, the surfaces of the first segments 21A to 21E and the second segments 31A to 31D which come into contact with the light reflection portion 60, excluding a first region 26 and a second region 36 to be described later, act as specular reflection regions. The light reflection portion 60 is formed of, for example, the same material as that of the light reflection portion 50.

A portion of the surface of the first segment 21A excluding the first end surface 23, and a portion of the surface of the second segment 31A excluding the second end surface 33 are formed as roughly-polished surfaces. Accordingly, the first region 26 formed as the roughly-polished surface in the first segment 21A, and the second region 36 formed as the roughly-polished surface in the second segment 31A act as diffuse reflection regions due to the contact with the light reflection portion 60. That is, the first region 26 and the second region 36 diffusely reflect the incident scintillation light. In other words, the first region 26 acts as the diffuse reflection region by covering the surface of the first segment 21A, which is roughened, with the light reflection portion 60. The second region 36 acts as the diffuse reflection region by covering the surface of the second segment 31A, which is roughened, with the light reflection portion 60.

The first region 26 is formed on one surface of a pair of surfaces, which oppose each other, in the first segment 21A. The second region 36 is formed on one surface of a pair of surfaces, which oppose each other, in the second segment 31A. Specifically, in this example, the first segment 21 has two pairs of opposing surfaces on the surfaces other than the first end surface 23. The first region 26 is formed on one surface of the pair of surfaces such that the first region 26 is formed on the entirety of two adjacent surfaces among the surfaces of the first segment 21A excluding the first end surface 23. Similarly, the second region 36 is formed on the entirety of two adjacent surfaces among the surfaces of the second segment 31A excluding the second end surface 33.

The radiation detection unit 10 further includes a light guide portion 70 which allows the first segment 21E and the second segment 31E to be optically connected to each other. In the radiation detection unit 10, one side portion 62 of the light reflection portion 60 extends in the direction perpendicular to the direction D, and the one side portion 62 is provided between the surfaces 25 and 35 formed as the roughly-polished surfaces with an interval therebetween, thereby forming the light guide portion 70. Accordingly, an air layer 72 having a rectangular parallelepiped shape is formed between the one side portion 62 and the surfaces 25 and 35. In other words, the surfaces 25 and 35 are covered with the light reflection portion 60 to form a space (the air layer 72) between the surfaces 25 and 35, such that the light guide portion 70 is formed. Even by the light guide portion 70, the scintillation light is allowed to pass between the first segment 21E and the second segment 31E. Accordingly, compared to a case where only the connection portion 40 is provided, the passage amount of the scintillation light passing between the first segment 21E and the second segment 31E is increased. In addition, the surfaces 25 and 35 are not the roughly-polished surface but may be specular reflection surfaces.

In the radiation detection unit 10, in a case where any of the first segments 21A to 21E and the second segments 31A to 31E absorbs radiation and generates scintillation light, while reflection on the specular reflection regions and the diffuse reflection regions is repeated, a portion of the generated scintillation light reaches the first end surface 23, and the remainder reaches the second end surface 33. At this time, the scintillation light is attenuated by the first light scattering portions 22, the second light scattering portions 32, and the connection portion 40. Therefore, depending on the segment where the scintillation light is generated among the first segments 21A to 21E and the second segments 31A to 31E, the ratio of the amounts of the light that reaches the first end surface 23 and the second end surface 33 is changed in stages.

Therefore, for example, by calculating the ratio of the amounts of the light that reaches the first end surface 23 and the amounts of the light that reaches the second end surface 33, that is, by performing centroid calculation, the first segment 21 or the second segment 31 at which the scintillation light is generated (that is, the first segment 21 or the second segment 31, which absorbs radiation) can be specified. In the radiation detector 1, the first segment 21 or the second segment 31, which absorbs radiation, among the first segments 21A to 21E and the second segments 31A to 31E of the plurality of radiation detection units 10 is specified by using the centroid calculation. Otherwise, the first segment 21 or the second segment 31 at which the scintillation light is generated may be specified by a method other than the centroid calculation. For example, a maximum likelihood estimation method may be used.

The light detection unit 80 includes a first light detection portion 82 and a second light detection portion 84. The first light detection portion 82 is optically coupled to the first end surface 23 of the first segment 21A, for example, via an optical adhesive. The second light detection portion 84 is optically coupled to the second end surface 33 of the second segment 31A, for example, via an optical adhesive. The first light detection portion 82 detects the intensity of the scintillation light that is incident onto the first end surface 23, and outputs an electrical signal having a magnitude corresponding to the detection value. The second light detection portion 84 detects the intensity of the scintillation light that is incident onto the second end surface 33, and outputs an electrical signal having a magnitude corresponding to the detection value. Each of the light detection portions 82 and 84 is, for example, a semiconductor light detector using a photomultiplier tube, an avalanche photodiode (APD), a multi-pixel photon counter (MPPC), or the like. Here, the MPPC is a photon-counting device including a plurality of APD pixels operating in Geiger mode.

Figure 3:
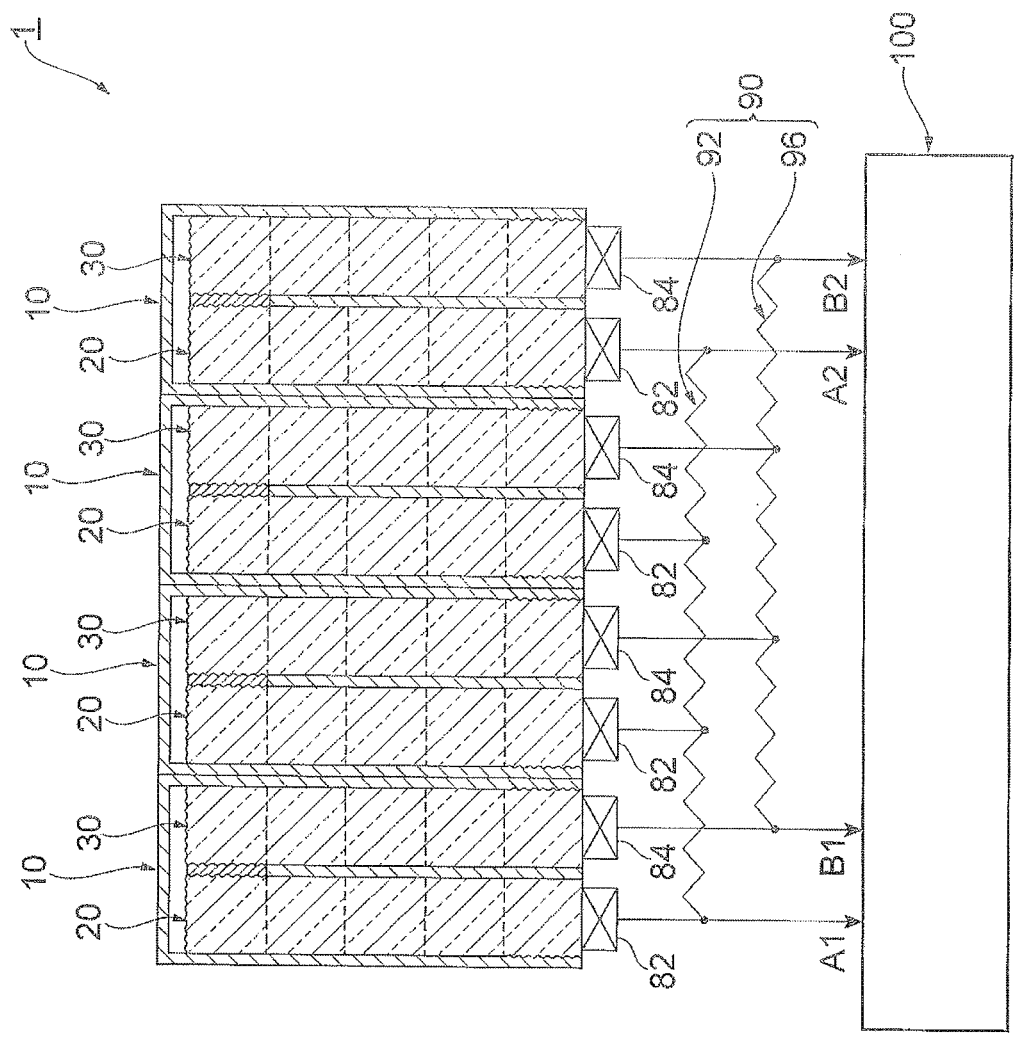
FIG. 3 is a sectional view of the radiation detector of FIG. 1.

As illustrated in FIG. 3, the radiation detector 1 further includes an output extraction portion 90 which extracts an output from the light detection unit 80 of each of the radiation detection units 10, and an operation portion 100 which specifies the generation position of the scintillation light on the basis of the output extracted from the output extraction portion 90. The output extraction portion 90 is electrically connected to each of the radiation detection units 10. The operation portion 100 is electrically connected to the output extraction portion 90.

The output extraction portion 90 includes a first resistor chain 92 and a second resistor chain 96. The first light detection portion 82 of each of the radiation detection units 10 is electrically connected to the first resistor chain 92. The second light detection portion 84 of each of the radiation detection units 10 is electrically connected to the second resistor chain 96.

Figure 4:
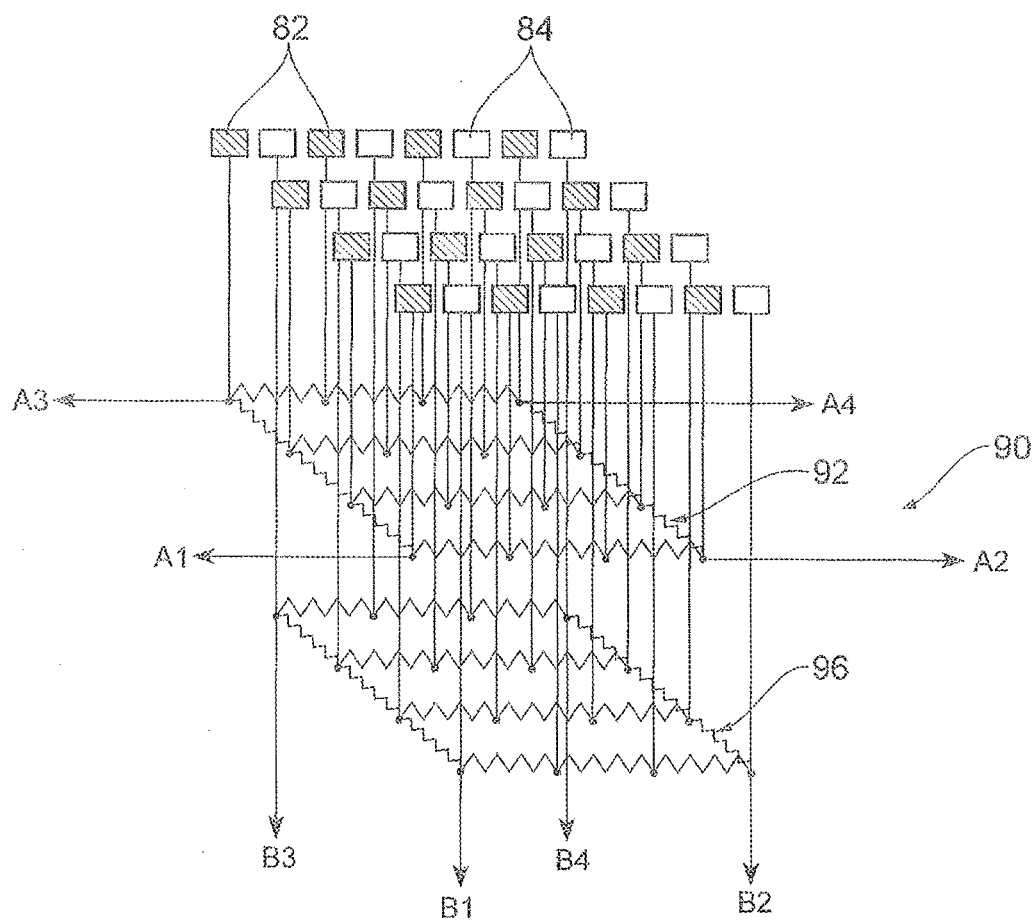
FIG. 4 is a conceptual diagram illustrating a connection state of an output extraction portion of FIG. 3.

As illustrated in FIG. 4, the positional relationship between the first light detection portion 82 and the second light detection portion 84 is common to the plurality of radiation detection units 10. That is, in any of the radiation detection units 10, the first light detection portion 82 is positioned on one side (left side in FIG. 4) in a row direction (the direction in which the first scintillator portion 20 and the second scintillator portion 30 are arranged), and the second light detection portion 84 is positioned on the other side (right side in FIG. 4) in the row direction.

In the first resistor chain 92, the first light detection portions 82 adjacent to each other in the row direction are connected to each other via a resistor. Furthermore, in the first resistor chain 92, the first light detection portions 82 positioned on one side in the row direction are connected to each other via the resistor, and the first light detection portions 82 positioned on the other side in the row direction are connected to each other via the resistor. That is, in the first resistor chain 92, the first light detection portions 82 which are adjacent to each other in the column direction (a direction perpendicular to the row direction on a plane on which the first scintillator portion 20 and the second scintillator portion 30 are arranged) are connected to each other via the resistor. In the second resistor chain 96, the second light detection portions 84 adjacent to each other in the row direction are connected to each other via a resistor. Furthermore, in the second resistor chain 96, the second light detection portions 84 positioned on the one side in the row direction are connected to each other via the resistor, and the second light detection portions 84 positioned on the other side in the row direction are connected to each other via the resistor. That is, in the second resistor chain 96, the second light detection portions 84 which are adjacent to each other in the column direction are connected to each other via the resistor.

To the operation portion 100, electrical signal values at four apexes of the first resistor chain 92 are input as outputs A1 to A4, and electrical signal values at four apexes of the second resistor chain 96 are input as outputs B1 to B4.

The operation portion 100 specifies the radiation detection unit 10 where scintillation light is generated on the basis of the outputs A1 to A4 and/or the outputs B1 to B4. Furthermore, the operation portion 100 specifies the segment where the scintillation light is generated among the first segments 21 and the second segments 31 of the specified radiation detection unit 10 on the basis of the outputs A1 to A4 and the outputs B1 to B4. Hereinafter, a method of specifying the segment where scintillation light is generated will be described.

Figure 5:
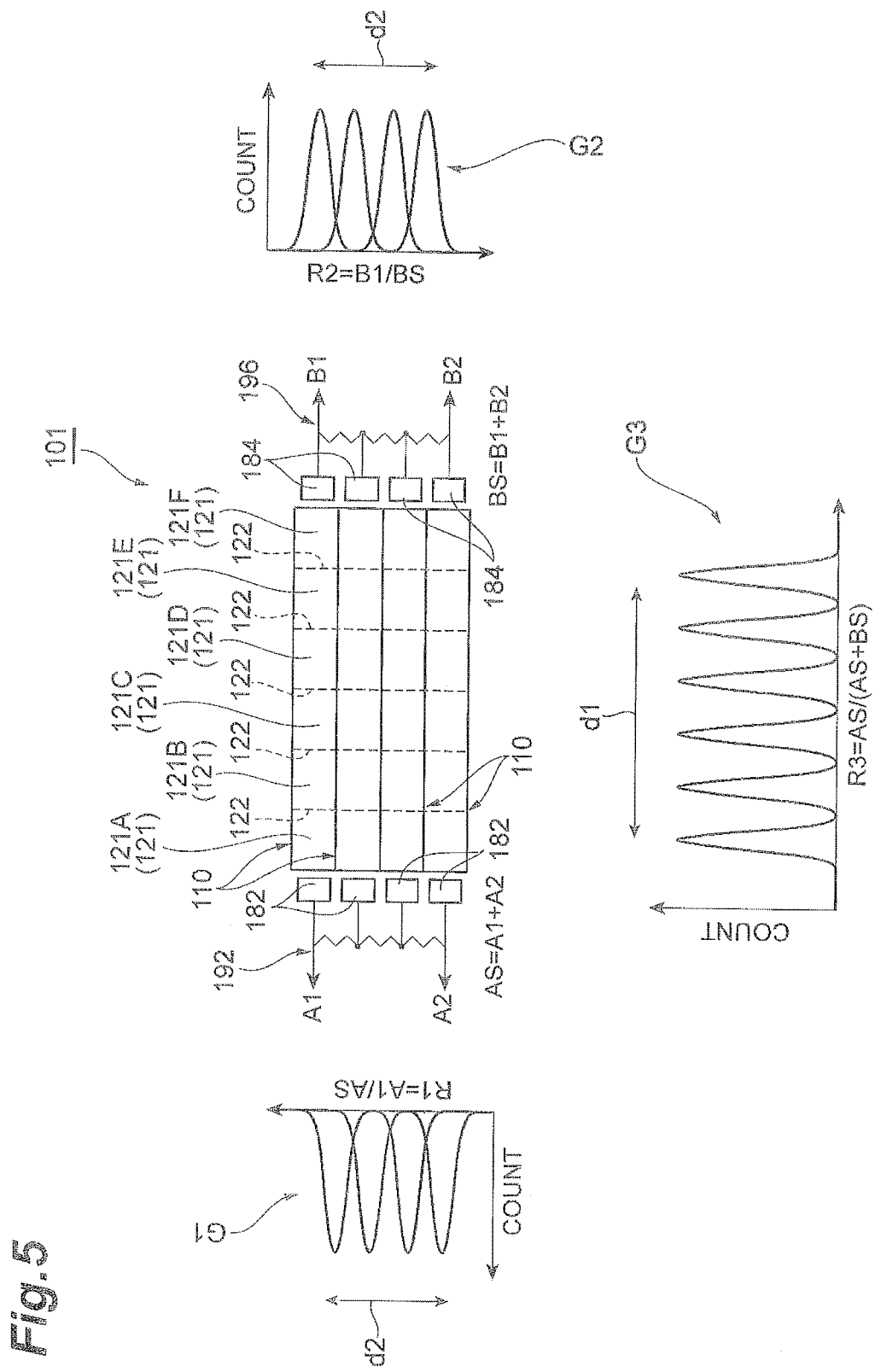
FIG. 5 is a conceptual diagram illustrating a method of specifying a segment where scintillation light is generated.

First, a radiation detector 101 illustrated in FIG. 5 will be described. As illustrated in FIG. 5, the radiation detector 101 includes four radiation detection units 110. Each of the radiation detection units 110 includes six segments 121 (segments 121A to 121F) arranged along a first direction d1. The radiation detection units 110 are arranged in a second direction d2 that is perpendicular to the first direction d1. The radiation detection units 110 adjacent to each other in the second direction d2 are optically separated from each other by a reflective member (not illustrated). In addition, a light scattering portion 122 is formed between the segments 121 adjacent to each other in the first direction d1. A first light detection portion 182 is optically connected to each of the segments 121A, and a second light detection portion 184 is optically connected to each of the segments 121F. The first light detection portions 182 are connected to the first resistor chain 192, and the second light detection portions 184 are connected to the second resistor chain 196.

In the radiation detector 101, an operation portion obtains the sum AS of the outputs A1 and A2 at both end portions of the first resistor chain 192, and the ratio R1 of the output A1 (or the difference between the outputs A1 and A2) and the sum AS using the following Expressions (1) and (2). The operation portion specifies the radiation detection unit 110 where scintillation light is generated, with reference to a histogram G1 that shows the relationship between the ratio R1 and the count.

$$AS=A1+A2 \quad (1)$$

$$R1=A1/AS, \text{ or } R1=(A1-A2)/AS \quad (2)$$

Instead of this or in addition to this, the operation portion may obtain the sum BS of the outputs B1 and B2 at both end portions of the second resistor chain 196, and the ratio R2 of the output B1 (or the difference between the outputs B1 and B2) and the sum BS using the following Expressions (3) and (4). In this case, the operation portion may specify the radiation detection unit 110 where scintillation light is generated, with reference to a histogram G2 that shows the relationship between the ratio R2 and the count.

$$BS=B1+B2 \quad (3)$$

$$R2=B1/BS, \text{ or } R2=(B1-B2)/BS \quad (4)$$

Instead of this or in addition to this, the operation portion may obtain the sum C1 of the outputs A1 and B1, the sum C2 of the outputs A2 and B2, and the sum CS of the outputs C1 and C2, and may obtain the ratio R3 of the sum C1 (or the difference between the sum C1 and the sum C2) and the sum CS. In this case, the operation portion may specify the radiation detection unit 110 where scintillation light is generated, with reference to a histogram (not illustrated) that shows the relationship between the ratio R3 and the count.

That is, the operation portion specifies the radiation detection unit 110 where scintillation light is generated, on the basis of the ratio of one of the outputs A1 and A2 from the first resistor chain 192, and one of the outputs B1 and B2 from the second resistor chain 196, or the ratio of the signal (A1+B1, A2+B2) which is the sum of the signals from both sides (that is, the ratio of at least one side).

Subsequently, the operation portion obtains the ratio R4 of the sum AS (or the difference between the sums AS and BS), and the sum of the sum AS and the sum BS using the following Expression (5). The operation portion specifies the segment 121 where scintillation light is generated among the plurality of segments 121 of the specified radiation detection unit 110 with reference to the histogram G3 that represents the ratio R4 and the count.

$$R4=AS/(AS+BS), \text{ or } R4=(AS-BS)/(AS+BS) \quad (5)$$

As described above, in the radiation detector 101, the specification of the radiation detection unit 110 where scintillation light is generated, and the specification of the segment 121 where scintillation light is generated, can be separately performed by the operations based on the outputs A1 and A2 and the outputs B1 and B2. That is, in each of the first direction d1 and the second direction d2, the position where the scintillation light is generated can be independently specified. As a result, the segment 121 where the scintillation light is generated can be specified.

By the similar processes as those of the radiation detector 101, in the scintillator portion 1, the operation portion 100 can specify the radiation detection unit 10 where scintillation light is generated on the basis of the outputs A1 to A4 and/or the outputs B1 and B4. The operation portion 100 can specify the segment where scintillation light is generated among the first segments 21 and the second segments 31 of the specified radiation detection unit 10 on the basis of the outputs A1 to A4 and the outputs B1 to B4. Otherwise, in the reverse order of the above-described processing order, the operation portion 100 may specify the segment where scintillation light is generated among the first segments 21 and the second segments 31 of the specified radiation detection unit 10 on the basis of the outputs A1 to A4 and the outputs B1 to B4, and thereafter specify the radiation detection unit having the specified segment (that is, the radiation detection unit 10 where the scintillation light is generated).

Figure 6:
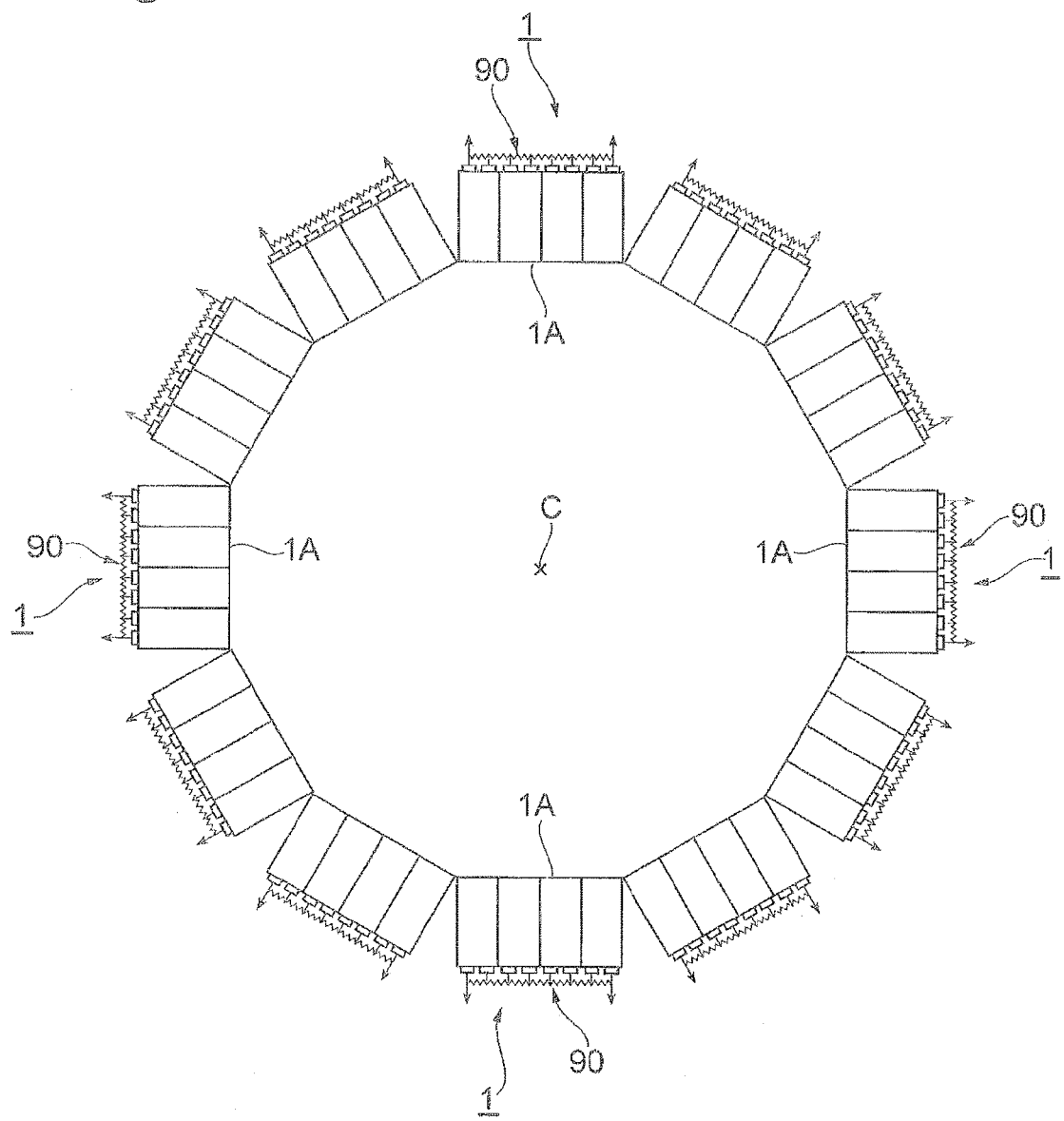
FIG. 6 is a schematic view of a PET apparatus on which the radiation detector of FIG. 1 is mounted.

Next, an example on which the radiation detectors 1 are mounted in an apparatus will be described with reference to FIG. 6. FIG. 6 is a schematic view of a PET apparatus on which the plurality of radiation detectors 1 are mounted. The plurality of radiation detectors 1 are arranged along the circumference of a circle having a center C as the center such that side surfaces 1A on the opposite side of a side on which the output extraction portions 90 are provided are directed toward the center C side of a measurement object. Accordingly, the output extraction portion 90 of each of the radiation detectors 1 is positioned on the outside in a radial direction of the circle having the center C as the center. Therefore, electrical connection of the operation portions 100 to the radiation detectors 1 can be performed from the outside in the radial direction. As described above, in the radiation detector 1, it becomes possible to easily cope with wiring. Otherwise, the plurality of radiation detectors 1 may also be arranged along the circumference of the circle having the center C as the center such that the side surfaces perpendicular to the direction D are directed toward the center C side.

Next, operational effects of the radiation detector 1 will be described.

In the radiation detector 1, by forming the first light scattering portion 22 between the first segments 21 adjacent to each other through laser irradiation, the first scintillator portion 20 is obtained. Similarly, by forming the second light scattering portion 32 between the second segments 31 adjacent to each other through laser irradiation, the second scintillator portion 30 is obtained. Therefore, for example, compared to a case where a plurality of scintillator blocks are joined to each other while allowing light scattering members to be interposed therebetween, the first scintillator portion 20 and the second scintillator portion 30 can be obtained easily and with high dimensional accuracy. In addition, in the radiation detector 1, the light detection unit 80 is optically connected to the first end surface 23 of the first segment 21A and the second end surface 33 of the second segment 31A. Therefore, electrical connection to the light detection unit 80 can be performed from the one side in the direction D (lower side in FIG. 2). As described above, in the radiation detector 1, ease of manufacturing, high accuracy, and ease of mounting on an apparatus are achieved.

In the radiation detector 1, by disposing the light reflection portion 50 between the first segments 21A to 21D and the second segments 31A to 31D, predetermined optical separation can be easily and reliably realized.

In the radiation detector 1, between the plurality of radiation detection units 10, the first light detection portions 82 are connected to the first resistor chain 92, and the second light detection portions 84 are connected to the second resistor chain 96. Therefore, for example, compared to a case where an output is separately extracted from each of a plurality of light detection portions, the number of outputs can be reduced. In addition, by the operations based on the outputs A1 to A4 and the outputs B1 to B4 respectively extracted from the first resistor chain 92 and the second resistor chain 96, the specification of the radiation detection unit 10 where scintillation light is generated, and the specification of the first segment 21 or the second segment 31 where scintillation light is generated, can be separately performed. Therefore, a good characteristic of discrimination between the segments can be ensured while reducing the number of outputs.

In the radiation detector 1, the passage amount of scintillation light between the first segment 21E and the second segment 31E is increased due to the light guide portion 70. That is, the light guide portion 70 functions as a light guide. Therefore, the characteristic of discrimination between the segments can be enhanced.

In the radiation detector 1, since the diffuse reflection region is provided on the surface of the first segment 21A, the characteristics of an output extracted in a case where scintillation light is generated can be differentiated between the first segment 21A and the first segment 21B. Therefore, the characteristic of discrimination between the first segments 21A and 21B can be enhanced. Similarly, since the diffuse reflection region is provided on the surface of the second segment 31A, the characteristic of discrimination between the second segments 31A and 31B can be enhanced.

In the radiation detector 1, the first scintillator portion 20 and the second scintillator portion 30 are arranged so that the first light scattering portion 22 and the corresponding second light scattering portion 32 are adjacent to each other in the direction perpendicular to the direction D. Therefore, when the light scattering portions 22 and 32 are formed, laser irradiation can be efficiently performed.

In the radiation detector 1, the first light detection portions 82 having the same positional relationship are connected to the first resistor chain 92, and the second light detection portions 84 having the same positional relationship are connected to the second resistor chain 96. Therefore, good discrimination between the segments can be performed by a relatively simple process.

In the radiation detector 1, since the plurality of radiation detection units 10 are two-dimensionally arranged, the radiation detection range can be widened. In addition, even in a case where the plurality of radiation detection units 10 are two-dimensionally arranged as described above, a good characteristic of discrimination between the segments can be ensured while reducing the number of outputs.

In the radiation detector 1, the operation portion 100 specifies the radiation detection unit 10 where scintillation light is generated on the basis of at least one of the outputs A1 to A4 from the first resistor chain 92 and the outputs B1 to B4 from the second resistor chain 96, and specifies the segment where scintillation light is generated, among the first segments 21 and the second segments 31 on the basis of the outputs A1 to A4 and the outputs B1 to B4. By the operations, the specification of the radiation detection unit 10 where scintillation light is generated, and the specification of the segment where scintillation light is generated can be separately performed, and thus a good characteristic of discrimination can be obtained.

In the radiation detector 1, the first region 26 is formed on one surface of a pair of surfaces, which oppose each other, in the first segment 21A, and the second region 36 is formed on one surface of a pair of surfaces, which oppose each other, in the second segment 31A. In this case, since a plurality of the first regions 26 are formed so as to extend in different directions, scintillation light is properly diffused in the first segment 21A. In addition, compared to a configuration in which the first regions 26 are formed on both of the opposing surfaces, ease of processing is achieved. Similarly, scintillation light is properly diffused in the second segment 31A, and compared to a configuration in which the second regions 36 are formed on both of the opposing surfaces, ease of processing is achieved.

In the radiation detector 1, the first light scattering portion 22 and the second light scattering portion 32 are formed through laser irradiation. Therefore, by adjusting the area or formation density of the reformed region of each of the light scattering portions, the passage amount of scintillation light in each of the light scattering portions can be easily adjusted. Therefore, by increasing the passage amount of the light scattering portion formed at a position where the passage amount of scintillation light is relatively low, or by decreasing the passage amount of the light scattering portion formed at a position where the passage amount of scintillation light is relatively high, the characteristic of discrimination between the segments can be enhanced.

While the exemplary embodiment of the present invention has been described above, the present invention is not limited to the above embodiment and can be modified without departing from the gist described in the claims or applied to other fields.

Figure 7:
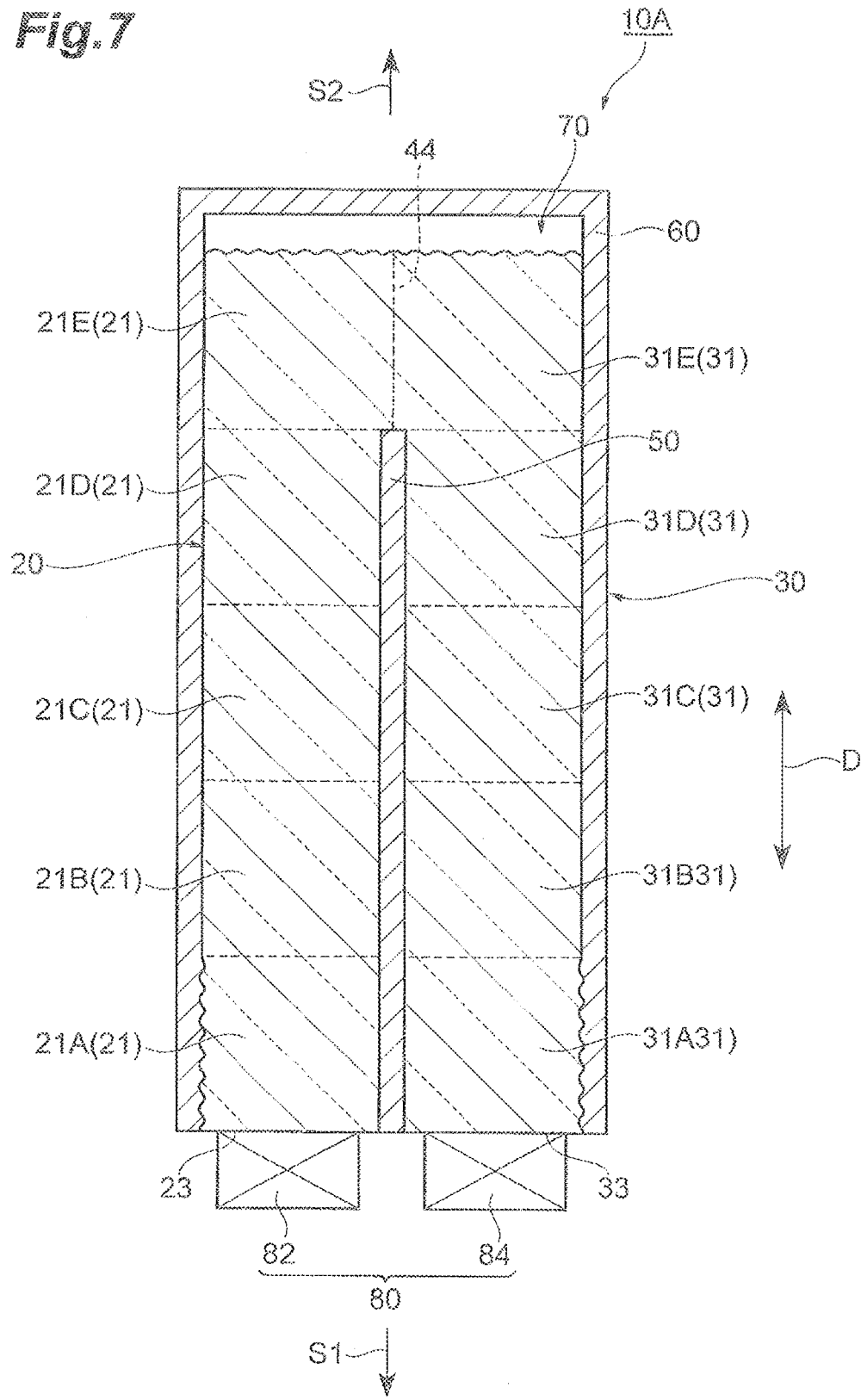
FIG. 7 is a sectional view of a first modification example of the radiation detector of FIG. 2.

For example, as in a radiation detection unit 10A of a first modification example illustrated in FIG. 7, the first scintillator portion 20 and the second scintillator portion 30 may also be formed integrally with each other. In this case, for example, the first scintillator portion 20 and the second scintillator portion 30 are formed by being cut from a single scintillator block. In a manufacturing process, for example, the boundary between the first segments 21A to 21D and the second segments 31A to 31D is cut by a dicing saw. In addition, the light reflection portion 50 is inserted between the first segments 21A to 21D and the second segments 31A to 31D. In the radiation detection unit 10A, a light scattering portion 44 formed through laser irradiation is provided instead of the connection portion 40, and accordingly, the first segment 21E and the second segment 31E are divided from each other.

Even in the first modification example, as in the above-described embodiment, ease of mounting on an apparatus can be achieved. In addition, according to the first modification example, a process of bonding the first scintillator portion 20 and the second scintillator portion 30 to each other is omitted, and thus ease of manufacturing and high accuracy can be further achieved. Moreover, since the first segment 21E and the second segment 31E are divided from each other by the light scattering portion 44 formed through laser irradiation, the passage amount of scintillation light between the first segment 21E and the second segment 31E can be easily adjusted.

Figure 8:
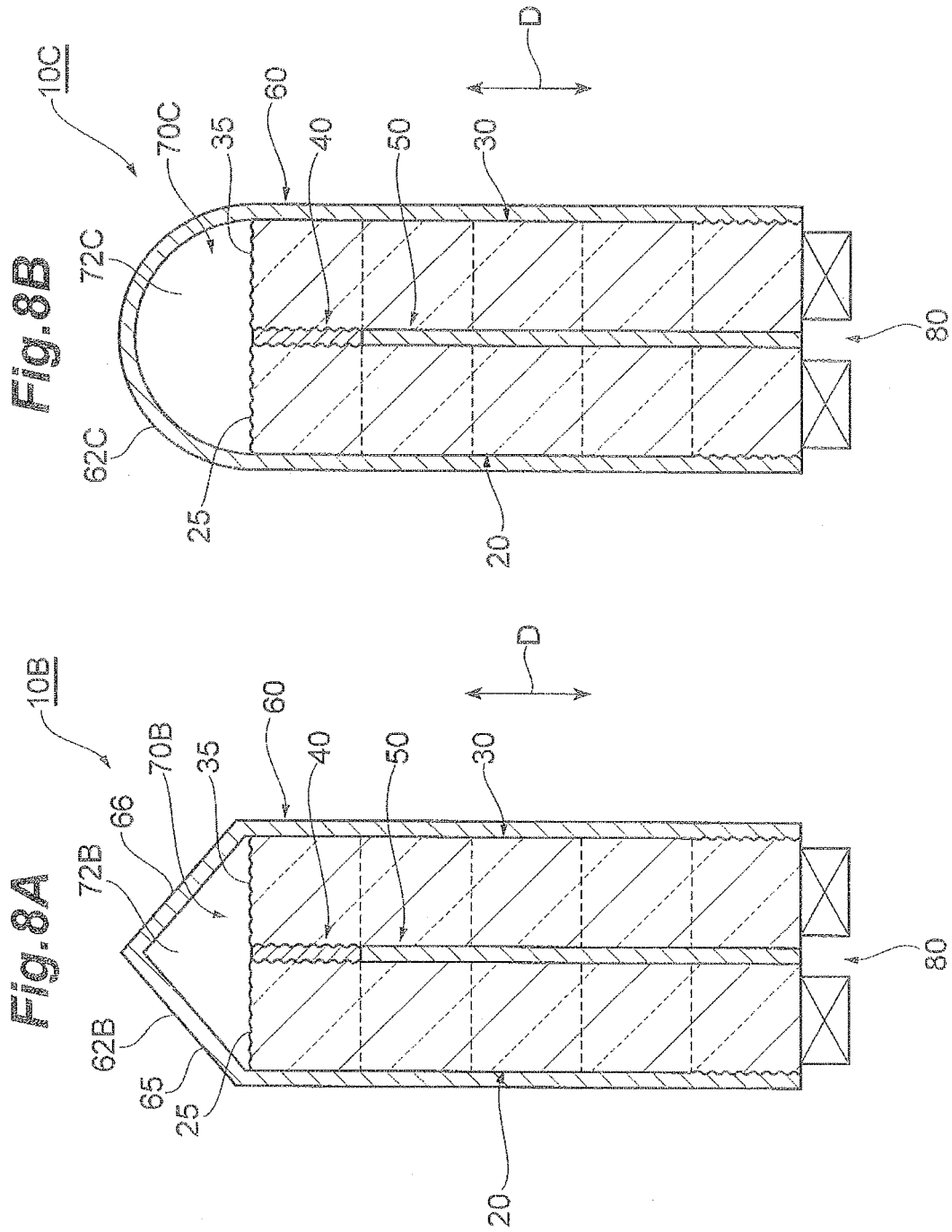
FIG. 8A is a sectional view of a second modification example of the radiation detection unit of FIG. 2.
FIG. 8B is a sectional view of a third modification example of the radiation detection unit of FIG. 2.

As in a radiation detection unit 10B of a second modification example illustrated in FIG. 8A and in a radiation detection unit 10C of a third modification example illustrated in FIG. 8B, the configuration of the light guide portion 70 may be changed. In the radiation detection unit 10B, one side portion 62B of the light reflection portion 60 includes a first portion 65 and a second portion 66 extending perpendicular to the direction D. In this example, the extension direction of the first portion 65 and the extension direction of the second portion 66 are perpendicular to each other. The first portion 65 and the second portion 66 are continuous at the tip end portions thereof (end portions on the opposite sides of the surfaces 25 and 35), and the tip end portions are positioned on the boundary line between the first scintillator portion 20 and the second scintillator portion 30. In this example, an air layer 72B having a triangular prism shape is formed between the one side portion 62B and the surfaces 25 and 35. In addition, in the radiation detection unit 10C, one side portion 62C of the light reflection portion 60 has a shape that is curved to be convex toward the opposite side of the surfaces 25 and 35. In this example, an air layer 72C having a semicircular prism shape is formed between the one side portion 62C and the surfaces 25 and 35.

Even in the second and third modification examples described above, as in the above-described embodiment, a good characteristic of discrimination between the segments can be ensured. In addition, in a region (space) corresponding to the air layers 72, 72B, or 72C, a light guide member formed of a material that can guide light (for example, a member formed of an acrylic resin and the like) may also be disposed.

Figure 9:
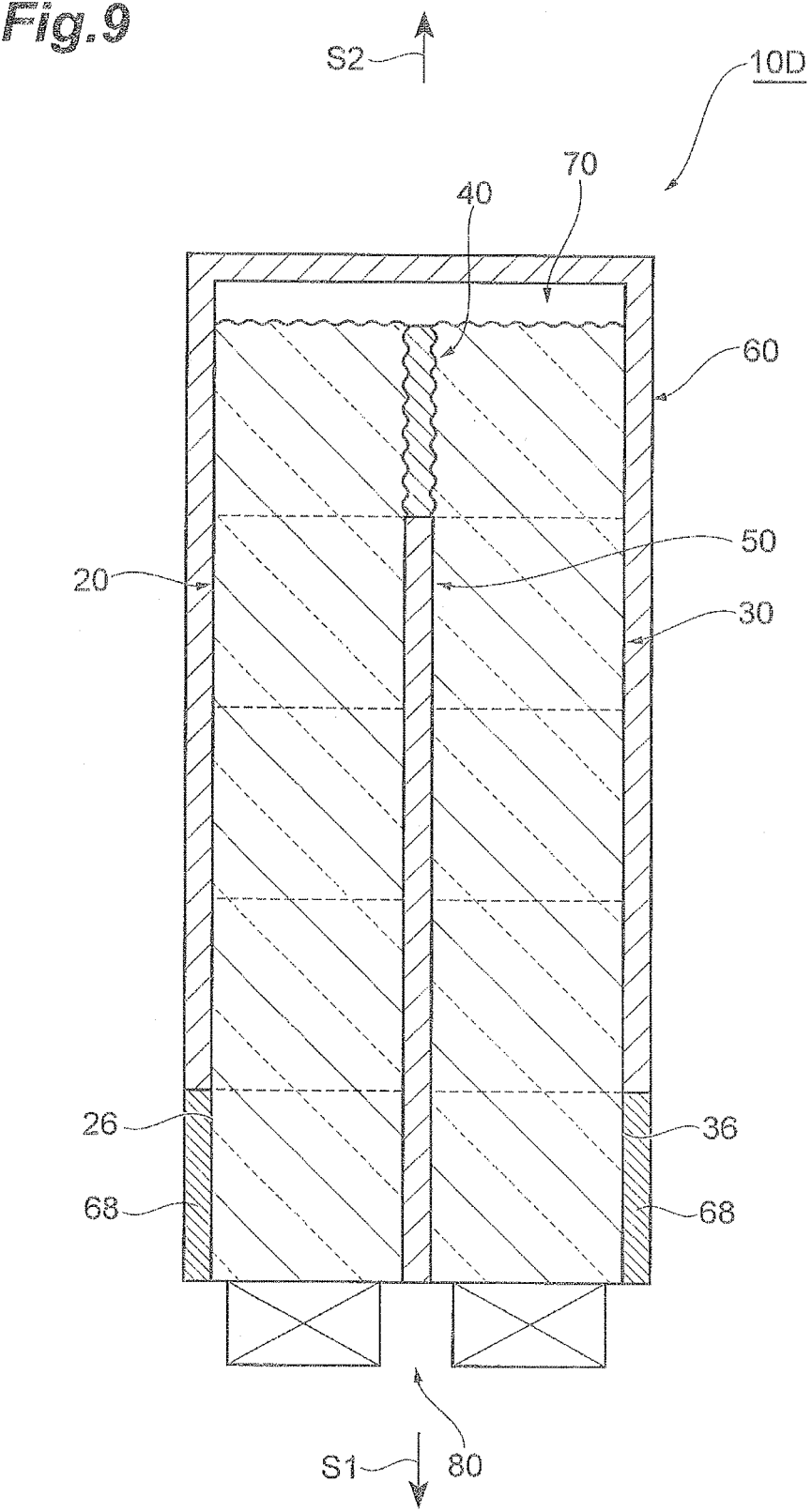
FIG. 9 is a sectional view of a fourth modification example of the radiation detection unit of FIG. 2.

As in a radiation detection unit 10D of a fourth modification example illustrated in FIG. 9, the configuration of the diffuse reflection region may be changed. In the radiation detection unit 10D, the light reflection portion 60 has diffuse reflection portions 68 that cover the first region 26 and the second region 36. The surface of the diffuse reflection portion 68 is formed as a diffuse reflection surface. In this case, the surfaces corresponding to the first region 26 and the second region 36 in the first scintillator portion 20 and the second scintillator portion 30 do not need to be roughly-polished surface, and the surfaces may also be smooth surfaces. Even in this configuration, the first region 26 and the second region 36 act as diffuse reflection regions. That is, in this example, the first region 26 acts as the diffuse reflection region by covering the surface of the first segment 21A with the diffuse reflection portion 68, and the second region 36 acts as the diffuse reflection region by covering the surface of the second segment 31A with the diffuse reflection portion 68. Therefore, even in the fourth modification example, the characteristic of discrimination between the second segments 31A and 31B can be enhanced. The first region 26 may be any region as long as the region includes at least a portion of the surface of the first segment 21A except for the first end surface 23. For example, the first region 26 may include the surface that comes into contact with the light reflection portion 50. In addition, the first region 26 may also include a portion of the surface of the first segment 21B. Even in these cases, the characteristic of discrimination between the first segments 21A and 21B can be enhanced. This is applied to the second region 36 in the same manner.

Figure 10:
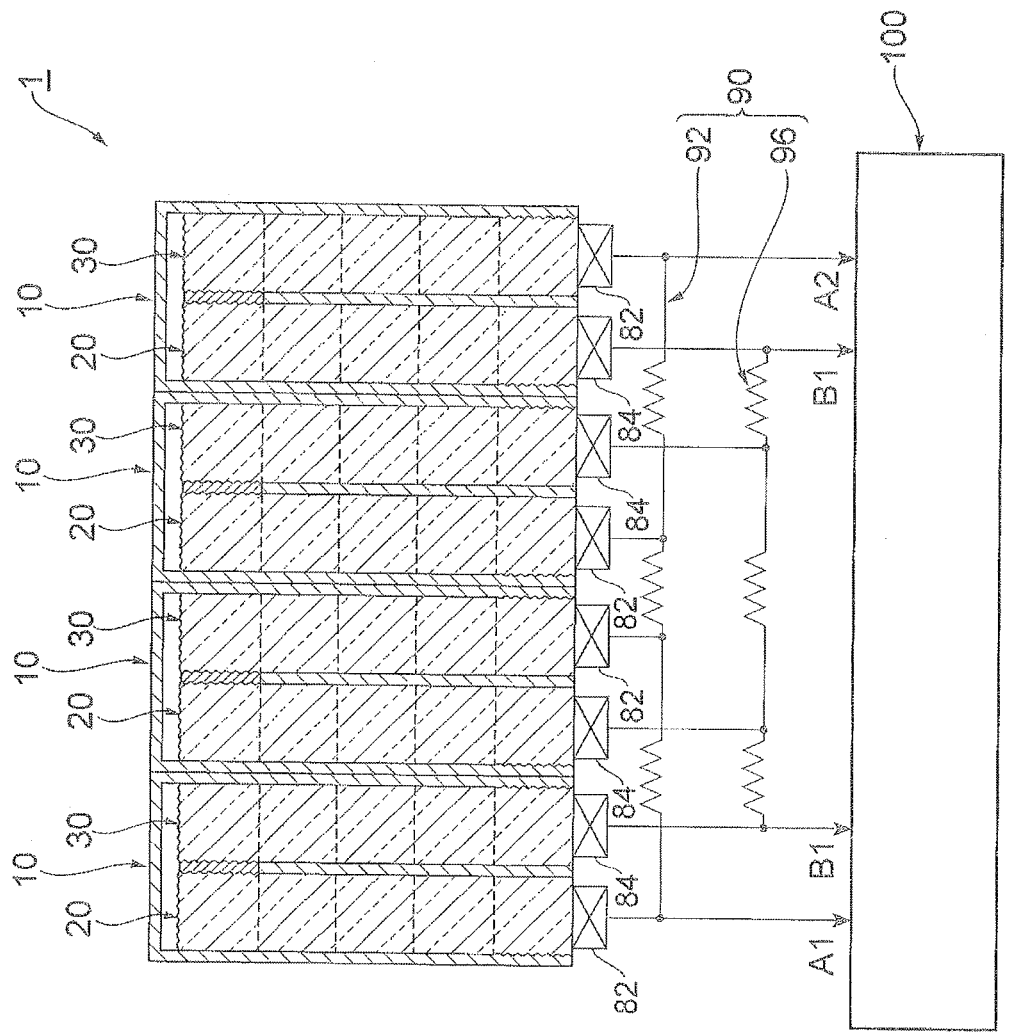
FIG. 10 is a sectional view of a fifth modification example of the radiation detector of FIG. 1.

As in a fifth modification example illustrated in FIG. 10, the configuration of the output extraction portion 90 may be changed. In the fifth modification example, the positional relationship between the first light detection portion 82 and the second light detection portion 84 is not common to the plurality of radiation detection units 10. Even in this case, when the arrangement of the first light detection portions 82 and the second light detection portions 84 is known, the segment where light detection unit is generated can be specified by the same process as that described above. Therefore, even in the fifth modification example, as in the above-described embodiment, ease of manufacturing, high accuracy, and ease of mounting on an apparatus are achieved. Furthermore, according to the fifth modification example, even in a case where scintillation light leaks between the adjacent radiation detection units 10, an error in the direction position of the scintillation light may be reduced.

A radiation detector 1E and a radiation detection unit 10E may be configured as in a sixth modification example illustrated in FIGS. 11A and 11B. In FIG. 11A, the light reflection portion 60 is not described. In the radiation detector 1E, as illustrated in FIG. 11B, a plurality of the radiation detection units 10E arranged in a matrix form having four rows and four columns. As illustrated in FIG. 11A, each of the plurality of radiation detection units 10E is configured by arranging scintillator portions 20E, which have the same configuration between the first scintillator portion 20 and the second scintillator portion 30, in a matrix form having two rows and two columns. The scintillator portions 20E adjacent to each other by optically coupled to each other by the connection portion 40 and are optically separated from each other by the light reflection portion 50. Each of the radiation detection units 10E includes four light detection portions 86A to 86D optically coupled to each other in the scintillator portion 20E. In FIG. 11B, below the radiation detector 1E, the arrangement of the light detection portions 86A to 86D are virtually illustrated by two-dot chain lines. Between the plurality of radiation detection units 10E, the light detection portions 86A are connected to a first resistor chain, the light detection portions 86B are connected to a second resistor chain, the light detection portions 86C are connected to a third resistor chain, and the light detection portions 86D are connected to a fourth resistor chain. Even in the sixth modification example, as in the above-described embodiment, ease of manufacturing, high accuracy, and ease of mounting on an apparatus are achieved.

The radiation detector 1 may be configured as in a seventh modification example illustrated in FIG. 12A. In the seventh modification example, without using the first resistor chain 92 and the second resistor chain 96, an output is extracted from each of the first light detection portions 82 and the second light detection portions 84 of the plurality of radiation detection units 10. Even in this case, the segment where scintillation light is generated can be specified by centroid calculation. Therefore, even in the seventh modification example, as in the above-described embodiment, ease of manufacturing, high accuracy, and ease of mounting on an apparatus are achieved. Here, the above-described embodiment is preferable because the number of outputs can be reduced.

The radiation detector 1 may be configured as in an eighth modification example illustrated in FIG. 12B. In the eighth modification example, a light detection portion 88 is optically connected to both of the first end surface 23 of the first segment 21A of one radiation detection unit 10 of the radiation detection units 10 adjacent to each other, and the second end surface 33 of the second segment 31A of the other radiation detection unit 10 of the radiation detection units 10 adjacent to each other. In addition, the light detection portion 88 disposed at the end portion is optically connected only to the first end surface 23 or the second end surface 33. The first resistor chain 92 and the second resistor chain 96 of the radiation detection unit 10 are not used as in the seventh modification example. Even in the eighth modification example, as in the above-described embodiment, ease of manufacturing, high accuracy, and ease of mounting on an apparatus are achieved. Furthermore, according to the eighth modification example, by reducing the number of light detection portions 88, the number of outputs can be reduced.

The radiation detector 1 may be configured as in a ninth modification example illustrated in FIG. 13A. A radiation detection unit 10H of the ninth modification example is configured such that the first scintillator portion 20 and the second scintillator portion 30 are optically connected to each other via two scintillator portions 20H interposed therebetween. The two scintillator portions 20H have the same configuration as the first scintillator portion 20 and the second scintillator portion 30, and are optically coupled to each other via the connection portion 40 interposed therebetween in the segments positioned closest to the one side S1 in the direction D. In addition, the scintillator portion 20H adjacent to the first scintillator portion 20 is optically coupled to the first segment 21E of the first scintillator portion 20 via the connection portion 40 interposed therebetween in the segment positioned closest to the other side S2 in the direction D. The scintillator portion 20H adjacent to the second scintillator portion 30 is optically coupled to the second segment 31E of the second scintillator portion 30 via the connection portion 40 interposed therebetween in the segment positioned closest to the other side S2 in the direction D. That is, the segments of the two scintillator portions 20H, which are positioned closest to the one side S1 in the direction D, are optically coupled to each other between the boundary surfaces thereof adjacent to each other (that is, the surfaces that oppose each other). In addition, the segments and the first and second segments 21E and 31E are optically coupled to each other between the boundary surfaces thereof adjacent to each other (that is, the surfaces that oppose each other). As described above, the first scintillator portion 20 and the second scintillator portion 30 may be optically connected to each other via a plurality of the scintillator portions 20H interposed therebetween.

The first resistor chain 92 and the second resistor chain 96 are not used as in the seventh modification example. Even in the ninth modification example, as in the above-described embodiment, ease of manufacturing, high accuracy, and ease of mounting on an apparatus are achieved. Furthermore, according to the ninth modification example, by reducing the number of light detection portions 88, the number of outputs can be reduced.

As in a tenth modification example illustrated in FIG. 13B, the configuration of the light detection unit 80 may be changed. A light detection unit 80I of the tenth modification example is configured by a position detection type light detector capable of detecting a position where scintillation light is detected. As the detector, for example, a position detection type photomultiplier tube, or a position detection type avalanche photodiode may be used. Even in the tenth modification example, as in the above-described embodiment, ease of manufacturing, high accuracy, and ease of mounting on an apparatus are achieved.

Figure 14A:
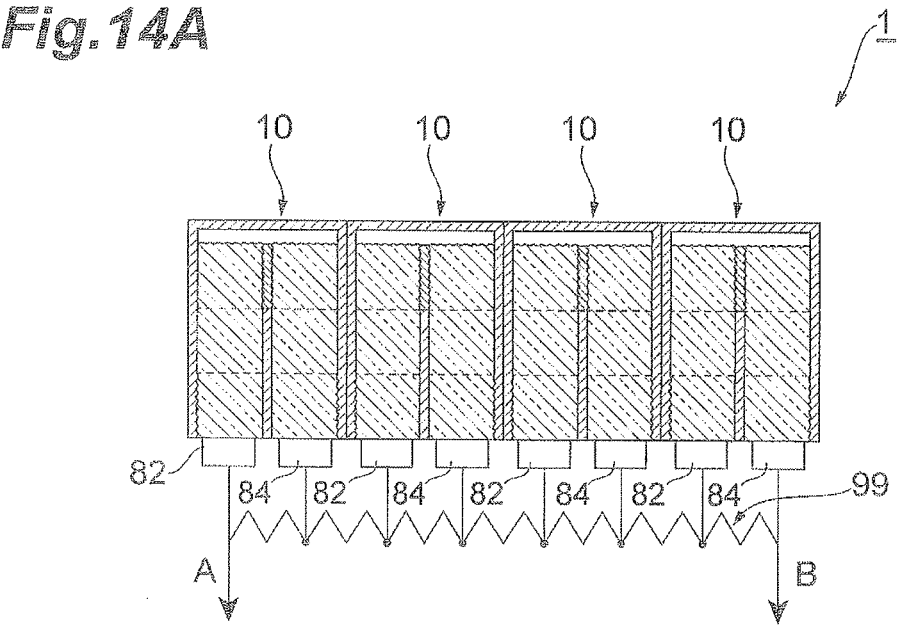
FIG. 14A is a sectional view of an eleventh modification example of the radiation detector of FIG. 1.

The radiation detector 1 may be configured as in an eleventh modification example illustrated in FIG. 14A. In the eleventh modification example, the first light detection portions 82 and the second light detection portions 84 of the plurality of radiation detection units 10 are connected to a single resistor chain 99. Even in this case, the segment where scintillation light is generated can be specified by centroid calculation. Therefore, even in the eleventh modification example, as in the above-described embodiment, ease of manufacturing, high accuracy, and ease of mounting on an apparatus are achieved. In the eleventh modification example, the structure is simplified, and the number of first segments 21 and the number of second segments 31 are three. This is applied to a twelfth modification example, which will be described below, in the same manner.

Figure 14B:
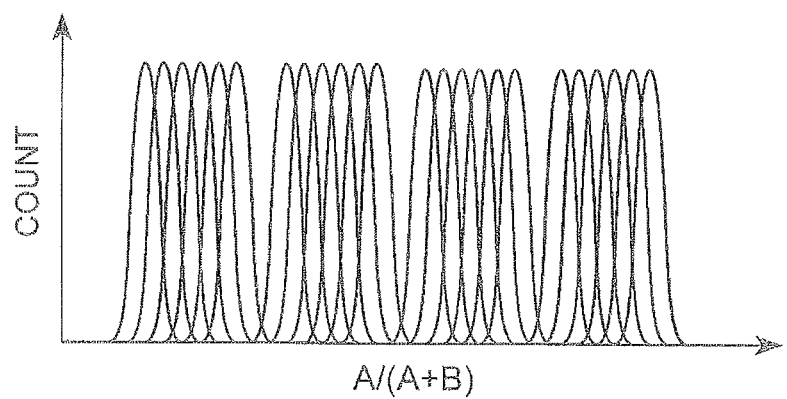
FIG. 14B is a graph illustrating a histogram of the eleventh modification example.
Figure 15A:
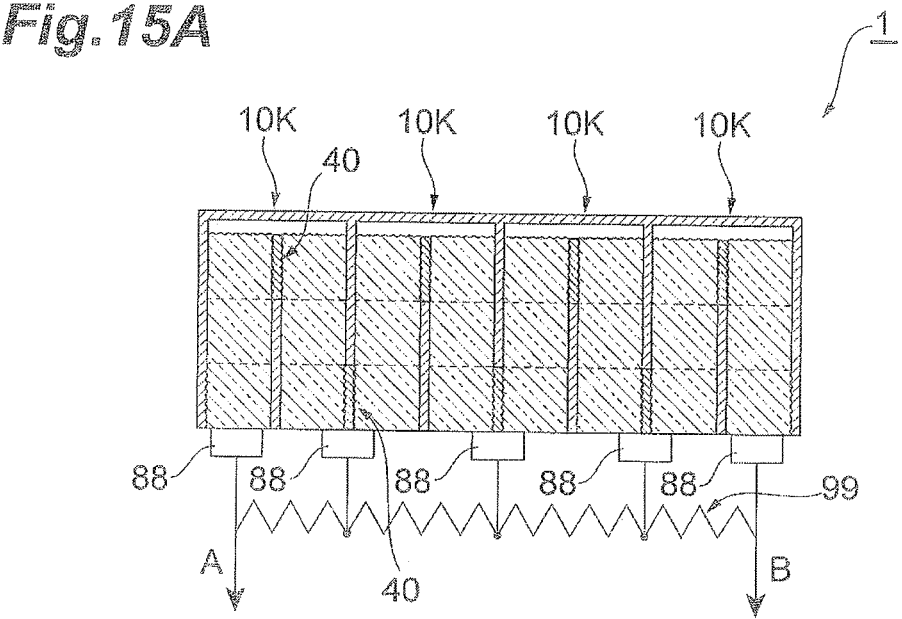
FIG. 15A is a sectional view of a twelfth modification example of the radiation detector of FIG. 1.
Figure 15B:
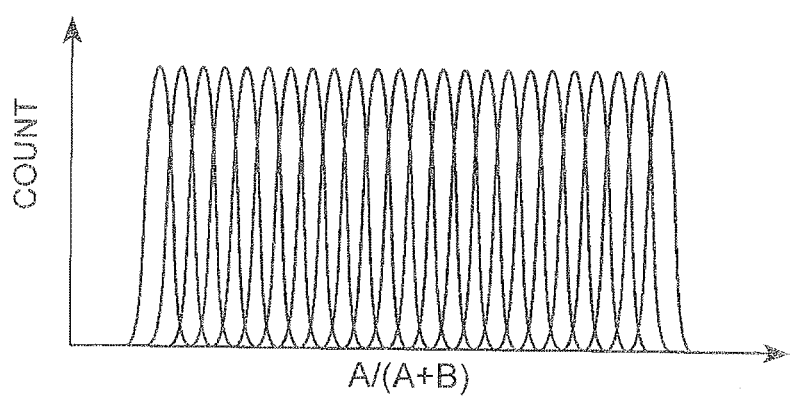
FIG. 15B is a graph illustrating a histogram of the twelfth modification example.

The radiation detector 1 may be configured as in the twelfth modification example illustrated in FIG. 15A. In the twelfth modification example, as in the eight modification example, the light detection portion 88 is optically connected to both of the first end surface 23 of the first segment 21A of one radiation detection unit 10K of radiation detection units 10K adjacent to each other, and the second end surface 33 of the second segment 31A of the other radiation detection unit 10K of the radiation detection units 10K adjacent to each other, and the light detection portions 88 are connected to the single resistor chain 99. In addition, the radiation detection units 10K adjacent to each other are optically coupled to each other via the connection portion 40 interposed therebetween in the segments positioned closest to the one side S1 in the direction D. In addition, the light reflection portion 60 is common to the radiation detection units 10K adjacent to each other. Even in the twelfth modification example, as in the above-described embodiment, ease of manufacturing, high accuracy, and ease of mounting on an apparatus are achieved. Furthermore, according to the twelfth modification example, by reducing the number of light detection portions 88, the number of outputs can be reduced. In addition, as illustrated in FIGS. 14B and 15B, the disparity of the distribution regarding the separation characteristics that occur between the radiation detection units 10 of the eleventh modification example is reduced in the twelfth modification example, and thus it is seen that good separation characteristics are provided. As described above, the twelfth modification example is preferable even in terms of enhancing the characteristic of discrimination between the segments.

Figure 20:
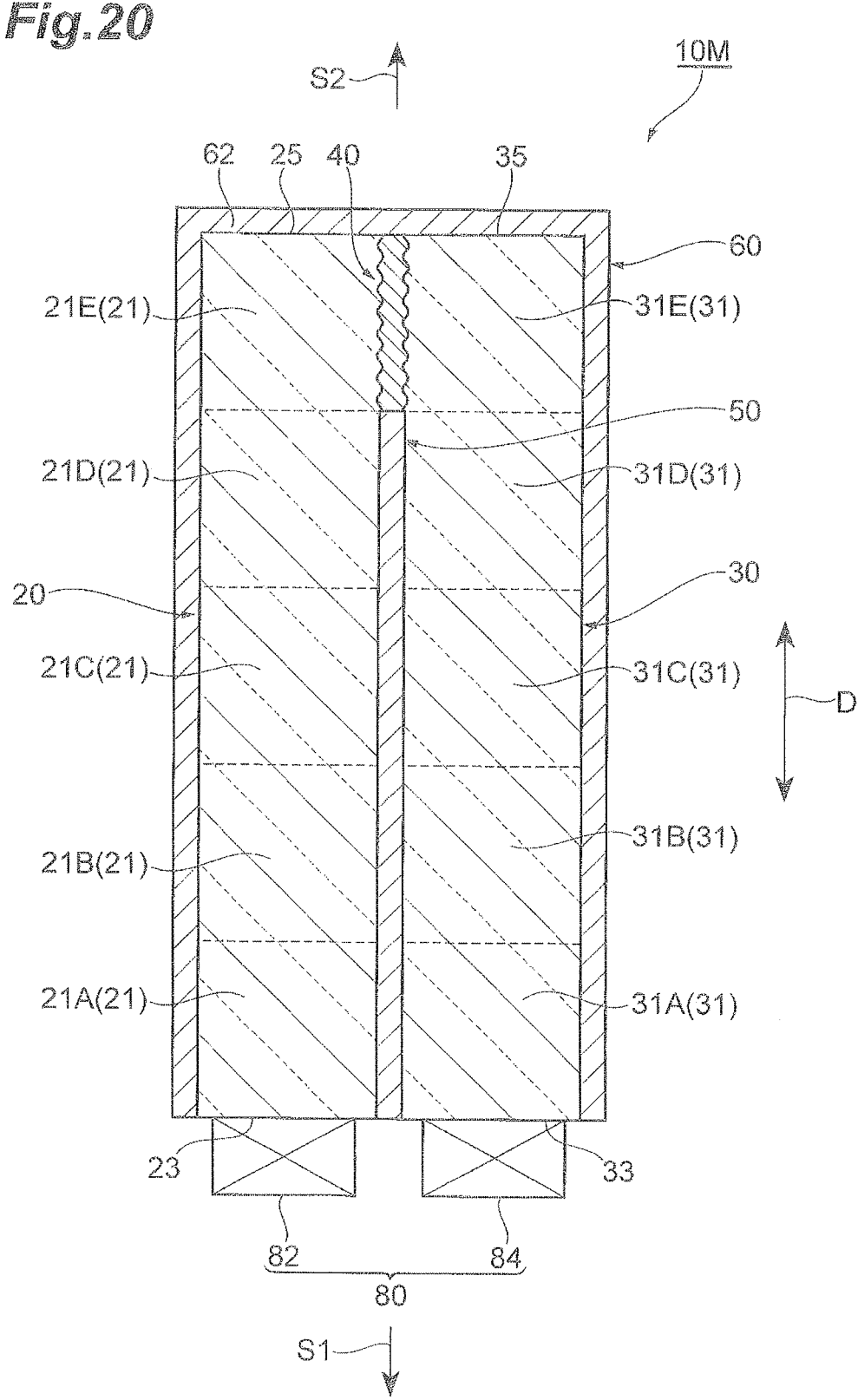
FIG. 20 is a sectional view of a thirteenth modification example of the radiation detection unit of FIG. 2.

As in a radiation detection unit 10M of a thirteenth modification example illustrated in FIG. 20, the light guide portion 70 may not be provided. In the thirteenth modification example, the one side portion 62 of the light reflection portion 60 is provided to come into contact with the surface 25 and the surface 35 formed as the specular reflection surfaces. Even in the thirteenth modification example, as in the above-described embodiment, ease of manufacturing, high accuracy, and ease of mounting on an apparatus are achieved. In addition, as in the radiation detection unit 10M of the thirteenth modification example, the first region 26 and the second region 36 which act as diffuse reflection regions may not be formed. In the thirteenth modification example, the entirety of the surface of the first segment 21A and the surface of the second segment 31A are formed as specular reflection regions.

Figure 21:
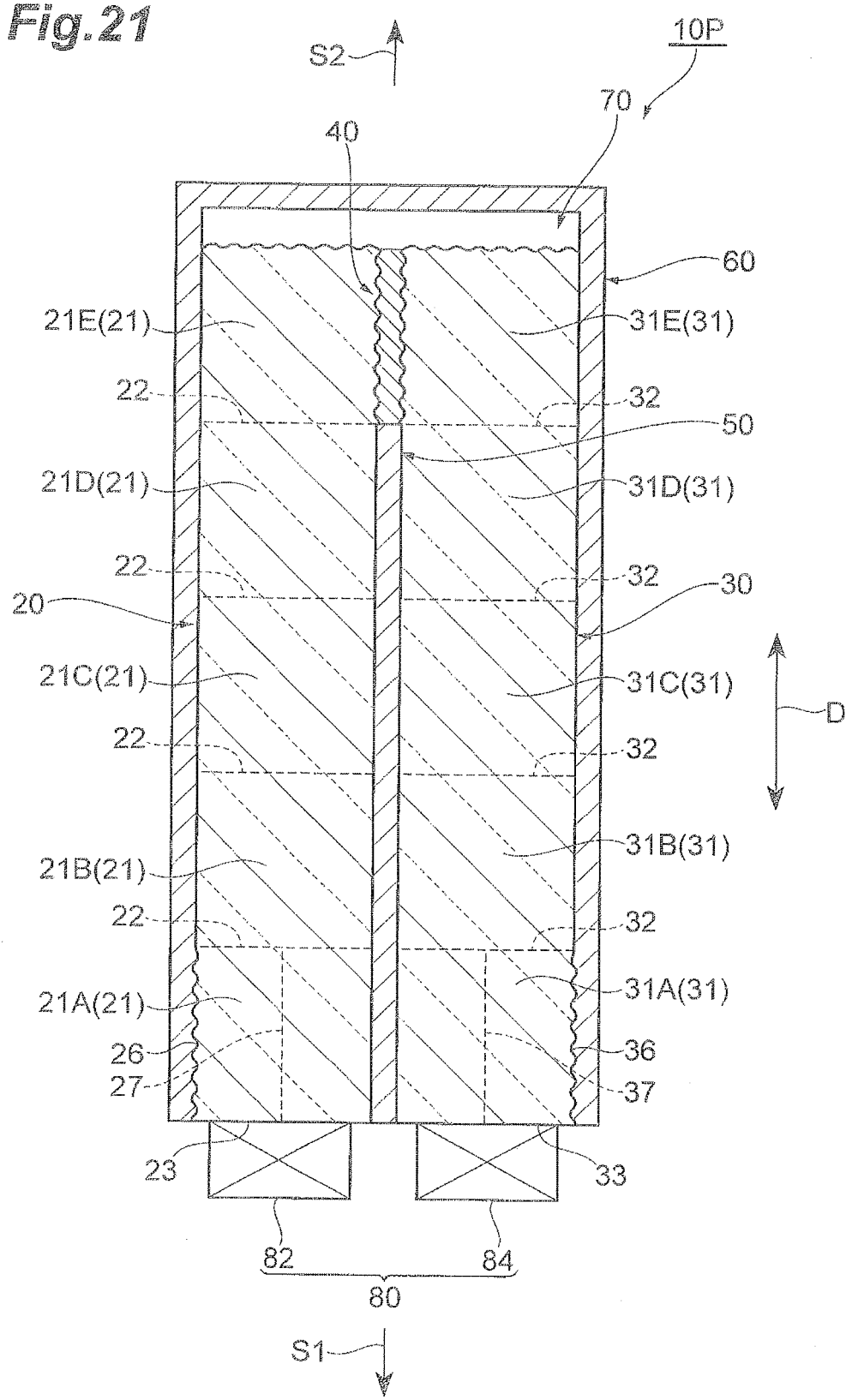
FIG. 21 is a sectional view of a fourteenth modification example of the radiation detector of FIG. 2.

A radiation detection unit 10P may also be configured as in a fourteenth modification example illustrated in FIG. 21. In the fourteenth modification example, a flat light scattering surface 27 is provided in the first segment 21A. The light scattering surface 27 is disposed along the direction D and extends between the first end surface 23 and the first light scattering portion 22 between the first segments 21A and 21B. The light scattering surface 27 is disposed to pass through the center of the first segment 21A. In addition, a flat light scattering surface 37 is provided in the second segment 31A. The light scattering surface 37 is disposed along the direction D and extends between the second end surface 33 and the second light scattering portion 32 between the second segments 31A and 31B. The light scattering surface 37 is disposed to pass through the center of the second segment 31A. Each of the light scattering surfaces 27 and 37 are formed through laser irradiation similar to each of the light scattering portions 22 and 32.

Even in the fourteenth modification example, as in the above-described embodiment, ease of manufacturing, high accuracy, and ease of mounting on an apparatus can be achieved. Furthermore, since the light scattering surface 27 is provided in the first segment 21A, the characteristics of an output extracted in a case where scintillation light is generated (the ratio of outputs from both ends) can be differentiated between the first segment 21A and the first segment 21B. Therefore, the characteristic of discrimination between the first segments 21A and 21B can be enhanced. Similarly, since the light scattering surfaces 37 is provided in the second segment 31A, the characteristic of discrimination between the second segments 31A and 31B can be enhanced. In addition, in the fourteenth modification example, the light scattering surface 27 may not be disposed to pass through the center of the first segment 21A and may be disposed at an any position. The light scattering surface 27 may not be disposed along the direction D. A plurality of the light scattering surfaces 27 may be provided in the first segment 21A. The entirety of the light scattering surfaces 27 may be formed as a formation region in which the reformed region is formed, or the light scattering surfaces 27 may also have a non-formation region in which the reformed region is not formed. The non-formation region may have, for example, a rectangular shape. In the light scattering surface 27, the formation region and the non-formation region may be arranged in a checkered pattern. That is, the formation region and the non-formation region may each have a rectangular shape and may be alternately arranged. Otherwise, the formation region and the non-formation region may be arranged in a stripe pattern. That is, the formation region and the non-formation region may each have a band shape and may be alternately arranged. These are applied to the light scattering surface 37 in the same manner.

A radiation detection unit 10Q of a fifteenth modification example illustrated in FIG. 22A and a radiation detection unit 10R of a sixteenth modification example illustrated in FIG. 22B may also be configured. In the fifteenth modification example, a hemispherical optical coupling agent 73 is provided on the surface 25 of the first segment 21E, and a hemispherical optical coupling agent 74 is provided on the surface 35 of the second segment 31E. In the sixteenth modification example, a hemispherical optical coupling agent 75 is provided on the surface 25 of the first segment 21E and the surface 35 of the second segment 31E. The refractive index of the hemispherical optical coupling agents 73 to 75 is lower than that of each of the first and second scintillator portions 20 and 30. As the optical coupling agents 73 to 75, for example, the same material as that of the optical coupling agent 42 may be used. The surfaces 25 and 35 are specular reflection surfaces. Even in the fifteenth modification example and the sixteenth modification example, as in the above-described embodiment, ease of manufacturing, high accuracy, and ease of mounting on an apparatus are achieved. Furthermore, the passage amount of scintillation light between the first segment 21E and the second segment 31E can be further increased. That is, when there is a great difference between the refractive index of each of the scintillator portions 20 and 30 and the refractive index (approximate value 1) of the outside thereof (the air layer 72), the scintillation light that travels through the scintillator portions 20 and 30 is likely to be totally reflected at the surfaces 25 and 35, respectively, and it becomes difficult for the scintillation light to exit from each of the scintillator portions 20 and 30. Contrary to this, by providing the optical coupling agents 73 to 75 having a refractive index between the scintillator portions 20 and 30 and the air layer 72 on the surfaces 25 and 35, the scintillation light easily exits from the scintillator portions 20 and 30 to the air layer 72, and thus the passage amount of the scintillation light passing between the first segment 21E and the second segment 31E can be further increased. Particularly, in the sixteenth modification example, the optical coupling agent 75 functions as a light guide, and thus the passage amount of the scintillation light passing between the first segment 21E and the second segment 31E can be further increased. The optical coupling agents 73 to 75 may have any shape, and for example, may have a rectangular parallelepiped shape. In addition, the surfaces 25 and 35 may also be roughly-polished surfaces.

A radiation detection unit 10S may be configured as in an seventeenth modification example illustrated in FIG. 23. In the seventeenth modification example, a light scattering surface 28 having a flat surface shape is provided in the first segment 21E. The light scattering surface 28 is disposed along the direction D so as to be perpendicular to the surface 24 of the first segment 21E. The light scattering surface 28 is disposed to pass through the center of the first segment 21E. In addition, a light scattering surface 38 having a flat surface shape is provided in the second segment 31E. The light scattering surface 38 is disposed along the direction D so as to be perpendicular to the surface 34 of the second segment 31E. The light scattering surface 38 is disposed to pass through the center of the second segment 31E. Similar to each of the light scattering portions 22 and 32, each of the light scattering surfaces 28 and 38 is formed through laser irradiation.

Even in the seventeenth modification example, as in the above-described embodiment, ease of manufacturing, high accuracy, and ease of mounting on an apparatus are achieved. Furthermore, the passage amount of the scintillation light passing between the first segment 21E and the second segment 31E can be further increased. In addition, in the seventeenth modification example, the light scattering surface 28 may not be disposed to pass through the center of the first segment 21E and may be disposed at an any position. In addition, the light scattering surface 28 may not be disposed along the direction D. The plurality of light scattering surfaces 28 may also be provided in the first segment 21E. The entirety of the light scattering surface 28 may have formation regions in which a reformed region is formed, and the light scattering surface 27 may have non-formation regions in which a reformed region is not formed. The non-formation region may have, for example, a rectangular shape. In the light scattering surface 28, the formation regions and the non-formation regions may be arranged in a check pattern. That is, the formation regions and the non-formation regions may each have rectangular shapes and may be alternately arranged. Alternatively, the formation regions and the non-formation regions may be arranged in a stripe pattern. That is, the formation regions and the non-formation regions may each have band shapes and may be alternately arranged. These are applied to the light scattering surface 38 in the same manner. In addition, the light guide portion 70 may be further provided.

Examples

Figure 16A:
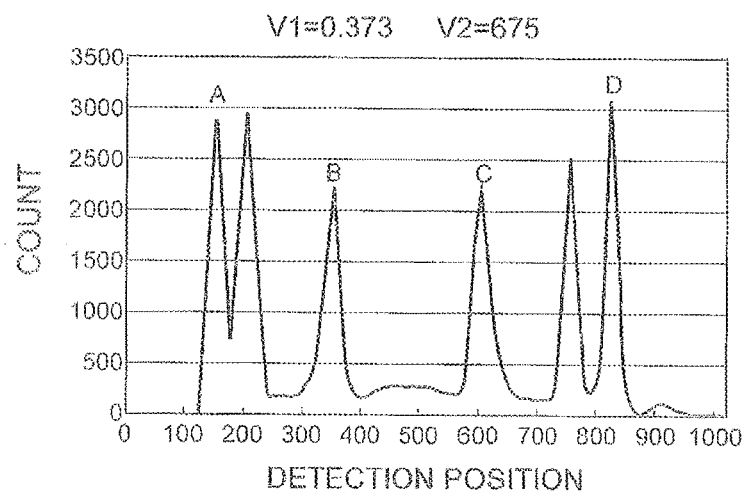
FIG. 16A is a graph showing a histogram of Example 1.

In Examples, the characteristic of discrimination between segments in a single radiation detection unit was examined. FIG. 16A is a graph showing a histogram of Example 1. In Example 1, each of the first segments 21 and the second segments 31 was three in number. In addition, as in the thirteenth modification example, the surfaces 24 and 34 in the connection portion 40 were formed as specular reflection surfaces other than roughly-polished surfaces, the entirety of the surfaces of the first segments 21 and the second segments 31 was formed as the specular reflection region, and the light guide portion 70 was not provided. The other points were the same as those of the above-described embodiment.

As evaluation indices of the discrimination characteristic, an index V1 and an index V2 were calculated by the following Expressions (6) and (7).

$$V1=(C-B)/(D-A) \quad (6)$$

$$V2=D-A \quad (7)$$

where A represents the position of an apex in a distribution of the first segments 21 positioned closest to the one side S1 in the direction D, B represents the position of an apex in a distribution of the first segments 21 positioned closest to the other side S2 in the direction D, C represents the position of an apex in a distribution of the second segments 31 positioned closest to the other side S2 in the direction D, and D represents the position of an apex in a distribution of the second segments 31 positioned closest to the one side S1 in the direction D. In order to increase the distance between the distributions and enhance the separation characteristics, it is preferable that the index V1 is decreased and the index V2 is increased.

In Example 1, the value of the index V1 was 0.373, and the value of the index V2 was 675. From FIG. 16A, it is seen that the distance between the distributions is great, and the separation characteristics are good.

Figure 16B:
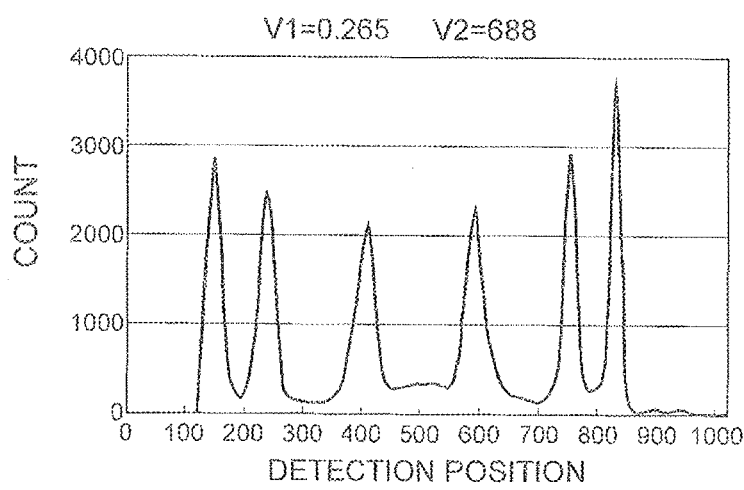
FIG. 16B is a graph showing a histogram of Example 2.

FIG. 16B is a graph showing a histogram of Example 2. In Example 2, as in the above-described embodiment, the surfaces 24 and 34 were formed as roughly-polished surfaces. The other points were the same as those of Example 1. In Example 2, the value of the index V1 was 0.265, and the value of the index V2 was 688. Both of the index V1 and the index V2 were enhanced compared to those of Example 1. As the two peaks B and C at the center became close to each other, the peaks on the outsides thereof were pulled toward the inside, and thus the distance between the peaks A and D which are on the outermost side was increased, resulting in the enhancement of the ratio of the peak and valley of the separation characteristics.

Figure 17A:
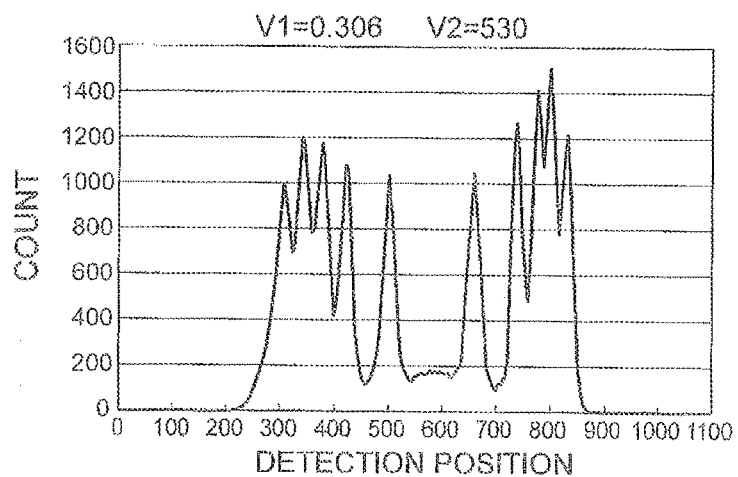
FIG. 17A is a graph showing a histogram of Example 3.

FIG. 17A is a graph showing a histogram of Example 3. In Example 3, each of the first segments 21 and the second segments 31 was five in number. In addition, as in the thirteenth modification example, the entirety of the surfaces of the first segments 21 and the second segments 31 was formed as the specular reflection region, and the light guide portion 70 was not provided. The other points were the same as those of the above-described embodiment. In Example 3, the value of the index V1 was 0.306, and the value of the index V2 was 530.

Figure 17B:
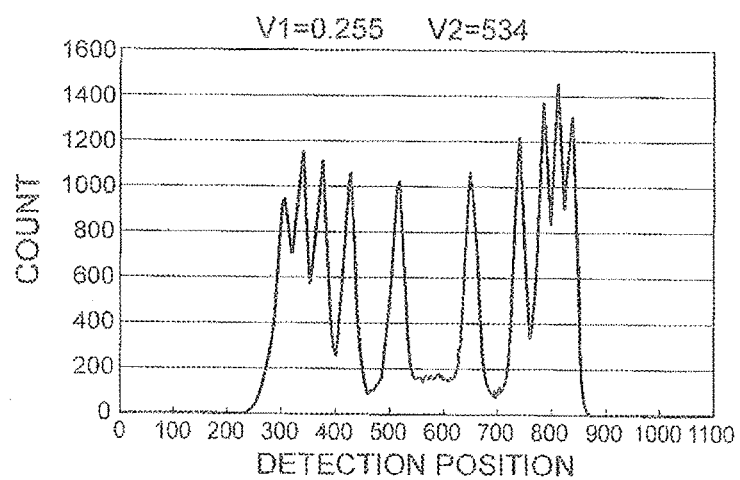
FIG. 17B is a graph showing a histogram of Example 4.

FIG. 17B is a graph showing a histogram of Example 4. In Example 4, the light guide portion 70 was provided. The other points were the same as those of Example 3. In Example 4, the value of the index V1 was 0.255, and the value of the index V2 was 534. As described above, both of the index V1 and the index V2 in Example 4 were enhanced compared to those of Example 3. From this, it is seen that the characteristic of discrimination between segments can be enhanced by providing the light guide portion 70.

From FIGS. 17A and 17B, it is seen that in Example 4, compared to Example 3, the distance between the distribution of the first segments 21 positioned closest to the other side in the direction D and the distribution of the second segments 31 positioned closest to the other side in the direction D is reduced. From this, it is seen that the characteristic of discrimination between segments can be enhanced by providing the light guide portion 70.

Figure 18A:
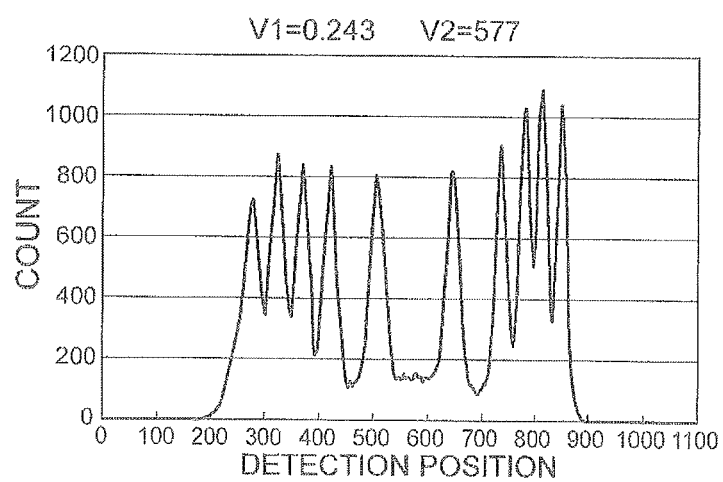
FIG. 18A is a graph showing a histogram of Example 5.

FIG. 18A is a graph showing a histogram of Example 5. In Example 5, as in the fourth modification example, the first region 26 and the second region 36 acted as the diffuse reflection region by providing the diffuse reflection portions 68 using a diffuse reflective material. The other points were the same as those of Example 4. In Example 5, the value of the index V1 was 0.243, and the value of the index V2 was 577. As described above, both of the index V1 and the index V2 were enhanced compared to those of Example 4. From this, it is seen that the characteristic of discrimination between segments can be enhanced by providing the diffuse reflection regions.

From FIGS. 17B and 18A, it is seen that in Example 5, compared to Example 4, the distance between the distribution of the first segments 21 positioned closest to the one side in the direction D and the distribution of the first segments 21 adjacent to each other on the other side in the direction D with respect to the first segments 21 is increased. From this, it is seen that the characteristic of discrimination between the first segments 21 can be enhanced by allowing the first region 26 to act as the diffuse reflection region. Similarly, it is seen that in Example 5, compared to Example 4, the distance between the distribution of the second segments 31 adjacent to each other on the one side in the direction D and the distribution of the second segments 31 positioned closest to the other side in the direction D with respect to the second segments 31 is increased. From this, it is seen that the characteristic of discrimination between the second segments 31 can be enhanced by allowing the second region 36 to act as the diffuse reflection region.

Figure 18B:
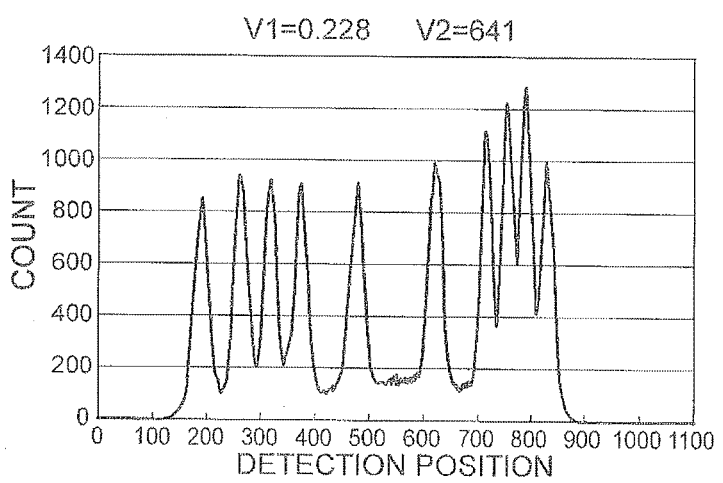
FIG. 18B is a graph showing a histogram of Example 6.

FIG. 18B is a graph showing a histogram of Example 6. In Example 6, as in the above-described embodiment, by roughening the first region 26 and the second region 36 to act as diffuse reflection surfaces, the first region 26 and the second region 36 were allowed to act as the diffuse reflection regions. The other points were the same as those of Example 4. In Example 6, the value of the index V1 was 0.228, and the value of the index V2 was 641. As described above, both of the index V1 and the index V2 were enhanced compared to those of Example 4. From this, it is seen that the characteristic of discrimination between segments can be enhanced by providing the diffuse reflection regions. In addition, from FIGS. 17B and 18B, it is seen that even in Example 6, compared to Example 4, the distance between the distribution of the first segments 21 positioned closest to the one side in the direction D and the distribution of the first segments 21 adjacent to each other on the other side in the direction D with respect to the first segments 21 is increased. In addition, it is seen that the same is applied to the second segment 31.

Figure 19A:
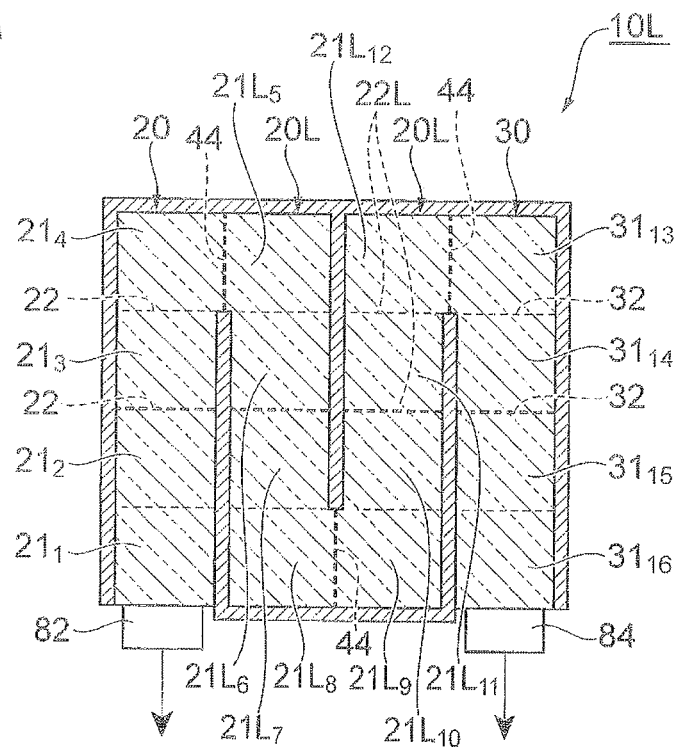
FIG. 19A is a sectional view of a radiation detection unit of Example 7.

FIG. 19A is a sectional view of a radiation detection unit 10L of Example 7. In Example 7, as in the first modification example, by cutting an single scintillator block, the radiation detection unit 10L including the first scintillator portion 20, the second scintillator portion 30, and two scintillator portions 20L which optically connect the first and second scintillator portions 20 and 30 to each other was formed. The first scintillator portion 20, the second scintillator portion 30, and the scintillator portions 20L were divided by light scattering portions 44 formed through laser irradiation. In Example 7, each of the first segments 21, the second segments 31, and segments 21L of the scintillator portion 20L were four in number. In addition, the light guide portion 70 was not provided. The other points were the same as those of the above-described embodiment. Hereinafter, the first segments 21, the segments 21L, and the second segments 31 arranged on an optical path from the first light detection portion 82 to the second light detection portion 84 are respectively referred to as a first segment $21_1$, a first segment $21_2$, a first segment $21_3$, a first segment $21_4$, a segment $21L_5$, a segment $21L_6$, a segment $21L_7$, a segment $21L_8$, a segment $21L_9$, a segment $21L_{10}$, a segment $21L_{11}$, a segment $21L_{12}$, a second segment $31_{13}$, a second segment $31_{14}$, a second segment $31_{15}$, and a second segment $31_{16}$.

In Example 7, the area of the reformed region in each of the first light scattering portion 22 between the first segments $21_2$ and $21_3$, the light scattering portion 44 between the first segment $21_4$ and the segment $21L_5$, a light scattering portion 22L between the segments $21L_6$ and $21L_7$, the light scattering portion 22L between the segments $21L_{10}$ and $21L_{11}$, the light scattering portion 44 between the segment $21L_{12}$ and the second segment $31_{13}$, and the second light scattering portion 32 between the second segments $31_{14}$ and $31_{15}$, which are formed at positions where the passage amount of scintillation light was relatively high, was reduced compared to those of the other light scattering portions, such that the passage amount of scintillation light between the segments was limited. In FIG. 19A, the light scattering portions in which the area of the reformed region was reduced are shown by thick lines. Otherwise, instead of reducing the area of the reformed region, the passage amount of scintillation light between segments may also be limited by reducing the formation density of the reformed region.

Figure 19B:
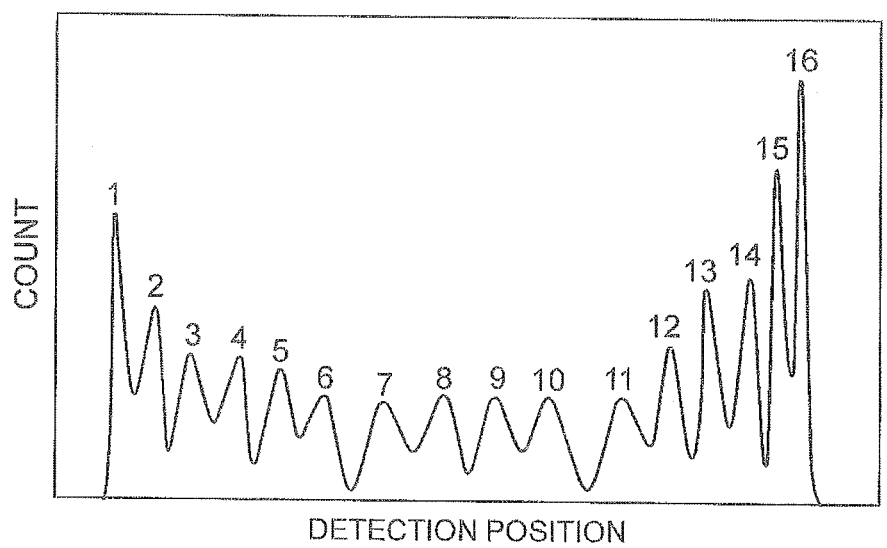
FIG. 19B is a graph showing a histogram of Example 7.

FIG. 19B is a graph showing a histogram of Example 7. Reference numerals 1 to 16 in FIG. 19B respectively represent the positions of apexes of distributions of the first segments $21_1$ to $21_4$ the segments $21L_5$ to $21_{12}$, and the second segments $31_{13}$ to $31_{16}$. From FIG. 19B, it is seen that the distance between the distributions is great, and the separation characteristics are good. From this, it is seen that the characteristic of discrimination between segments can be enhanced by limiting the passage amount of scintillation light between segments having a relatively high passage amount.

Figure 24A:
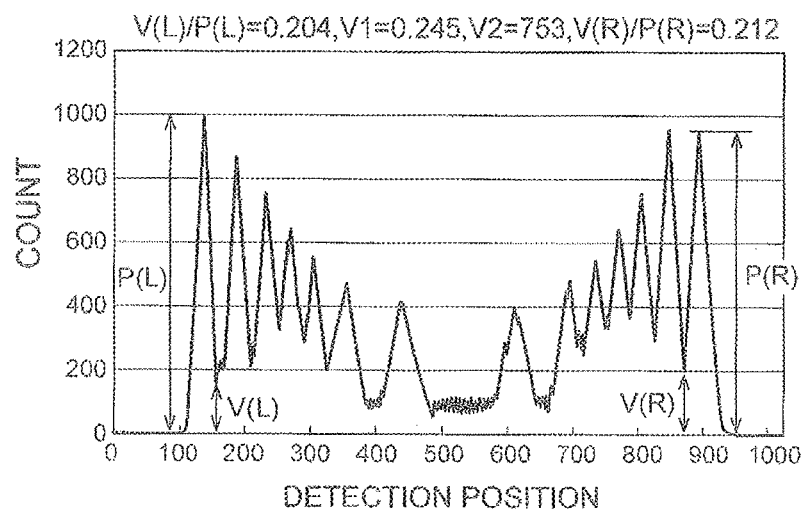
FIG. 24A is a graph showing a histogram of Example 8.

FIG. 24A is a graph showing a histogram of Example 8. In Example 8, each of the first segments 21 and the second segments 31 were seven in number. In addition, as in the thirteenth modification example, the surfaces 24 and 34 in the connection portion 40 were formed as specular reflection surfaces other than roughly-polished surfaces, the entirety of the surfaces of the first segments 21 and the second segments 31 was formed as the specular reflection region, and the light guide portion 70 was not provided. The other points were the same as those of the above-described embodiment.

As evaluation indices of the discrimination characteristic, in addition to the index V1 and index V2, an index V(L)/P(L) and an index V(R)/P(R) were calculated. Here, V(L) represents a count in the distribution of the first segments 21 which are adjacent to each other on the other side with respect to the first segments 21 positioned closest to the one side in the direction D, P(L) represents a count in the distribution of the first segments 21 positioned closest to the one side in the direction D, V(R) represents a count in the distribution of the second segments 31 which are adjacent to each other on the other side with respect to the second segments 31 positioned closest to the one side in the direction D, and P(R) represents a count in the distribution of the second segments 31 positioned closest to the one side in the direction D. In order to increase the distance between the distribution of the first segments 21 positioned closest to the one side in the direction D and the distribution of the first segments 21 which are adjacent to each other on the other side in the direction D with respect to the corresponding first segments 21 and enhance the separation characteristics, it is preferable that V(L)/P(L) is decreased. In order to increase the distance between the distribution of the second segments 31 positioned closest to the one side in the direction D and the distribution of the second segments 31 which are adjacent to each other on the other side in the direction D with respect to the corresponding second segments 31 and enhance the separation characteristics, it is preferable that the index V(R)/P(R) is decreased.

As shown in FIG. 24A, in Example 8, the value of the index V1 was 0.245, and the value of the index V2 was 753, the value of the index V(L)/P(L) was 0.204, and the value of the index V(R)/P(R) was 0.212.

Figure 24B:
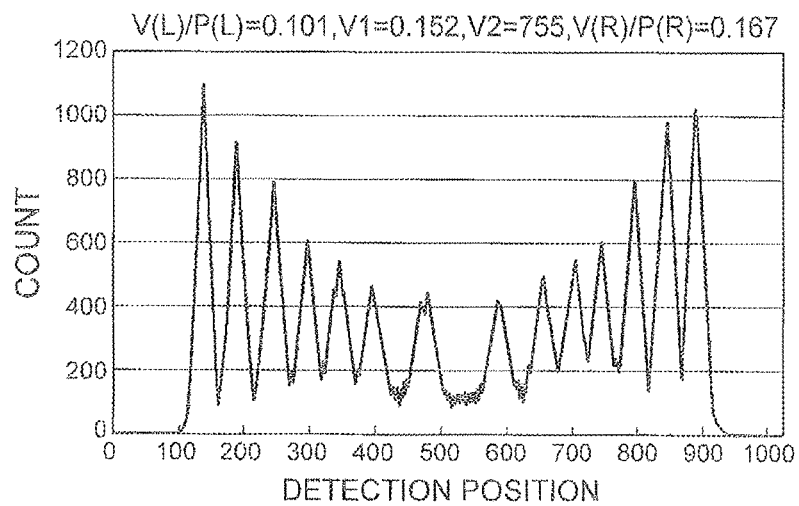
FIG. 24B is a graph showing a histogram of Example 9.

FIG. 24B is a graph showing a histogram of Example 9. In Example 9, the light guide portion 70 was provided. The other points were the same as those of Example 8. In Example 9, the value of the index V1 was 0.152, and the value of the index V2 was 755, the value of the index V(L)/P(L) was 0.101, and the value of the index V(R)/P(R) was 0.167. As described above, both of the index V1 and the index V2 in Example 9 were enhanced compared to those of Example 8. From this, it is seen that the characteristic of discrimination between segments can be enhanced by providing the light guide portion 70.

From FIGS. 23A and 23B, it is seen that in Example 9, compared to Example 8, the distance between the distribution of the first segments 21 positioned closest to the other side in the direction D and the distribution of the second segments 31 positioned closest to the other side in the direction D is reduced. From this, it is seen that the characteristic of discrimination between segments can be enhanced by providing the light guide portion 70.

Figure 25A:
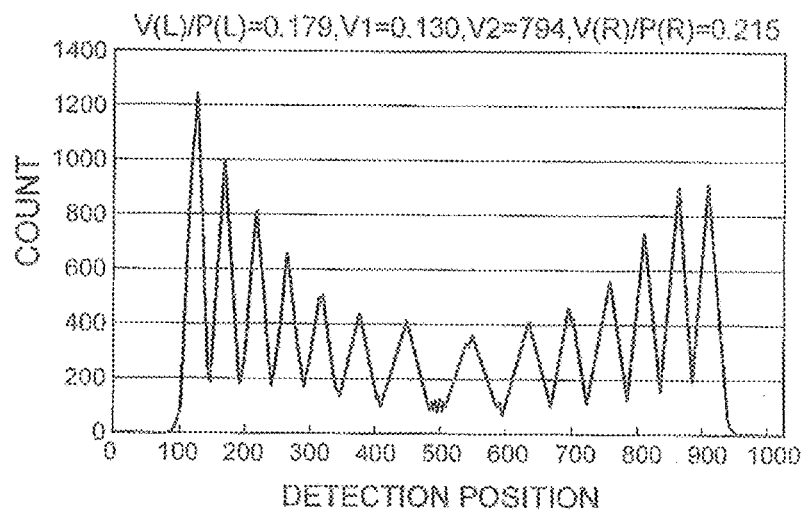
FIG. 25A is a graph showing a histogram of Example 10.

FIG. 25A is a graph showing a histogram of Example 10. In Example 10, as in the seventeenth modification example, the hemispherical optical coupling agent 73 was provided on the surface of the first segments 21 positioned closest to the other side in the direction D and the surface of the second segments 31 positioned closest to the other side in the direction D. The other points were the same as those of Example 9. In Example 10, the value of the index V1 was 0.130, and the value of the index V2 was 794, the value of the index V(L)/P(L) was 0.179, and the value of the index V(R)/P(R) was 0.215. As described above, both of the index V1 and the index V2 in Example 10 were enhanced compared to those of Example 9. From this, it is seen that the characteristic of discrimination between segments can be enhanced by providing the optical coupling agent 73.

From FIGS. 23B and 24A, it is seen that in Example 10, compared to Example 9, the distance between the distribution of the first segments 21 positioned closest to the other side in the direction D and the distribution of the second segments 31 positioned closest to the other side in the direction D is reduced. From this, it is seen that the characteristic of discrimination between segments can be enhanced by providing the optical coupling agent 73.

Figure 25B:
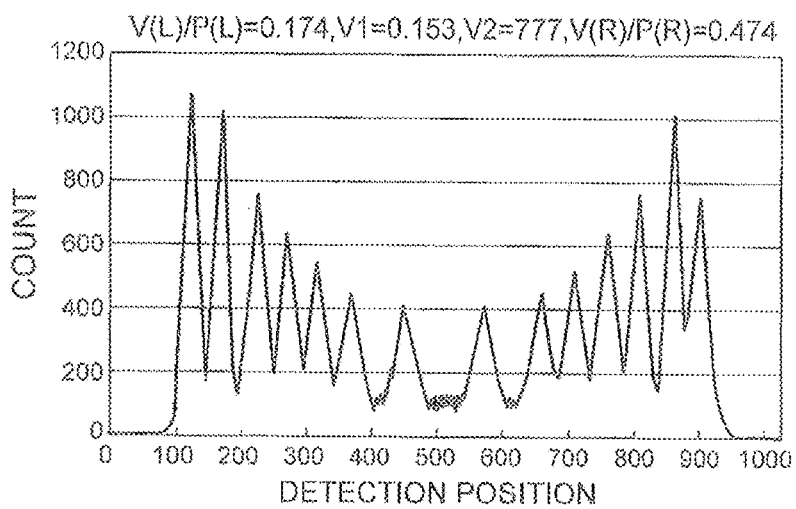
FIG. 25B is a graph showing a histogram of Example 11.

FIG. 25B is a graph showing a histogram of Example 11. In Example 11, as in the eighteenth modification example, the light scattering surface 28 was provided in the first segments 21 positioned closest to the other side in the direction D, and the light scattering surface 38 was provided in the second segments 31 positioned closest to the other side in the direction D. The other points were the same as those of Example 8. In Example 11, the value of the index V1 was 0.153, and the value of the index V2 was 777, the value of the index V(L)/P(L) was 0.174, and the value of the index V(R)/P(R) was 0.474. As described above, both of the index V1 and the index V2 in Example 11 were enhanced compared to those of Example 8. From this, it is seen that the characteristic of discrimination between segments can be enhanced by providing the light scattering surfaces 28 and 38.

From FIGS. 23A and 24B, it is seen that in Example 11, compared to Example 2, the distance between the distribution of the first segments 21 positioned closest to the other side in the direction D and the distribution of the second segments 31 positioned closest to the other side in the direction D is reduced. From this, it is seen that the characteristic of discrimination between segments can be enhanced by providing the light scattering surfaces 28 and 38.

Figure 26A:
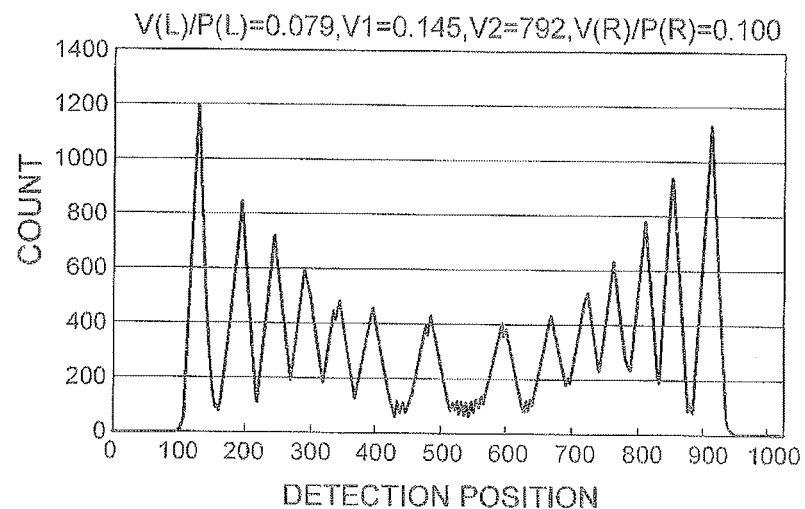
FIG. 26A is a graph showing a histogram of Example 12.

FIG. 26A is a graph showing a histogram of Example 12. In Example 12, as in the fourth modification example, the first region 26 and the second region 36 acted as the diffuse reflection region by providing the diffuse reflection portions 68 using a diffuse reflective material. In Example 12, the value of the index V1 was 0.145, and the value of the index V2 was 792, the value of the index V(L)/P(L) was 0.079, and the value of the index V(R)/P(R) was 0.100. As described above, both of the index V1 and the index V2 were enhanced compared to those of Example 9. From this, it is seen that the characteristic of discrimination between segments can be enhanced by providing the diffuse reflection regions. Furthermore, the index V(L)/P(L) was enhanced compared to that of Example 9. From this, it is seen that the characteristic of discrimination between the first segments 21 positioned closest to the one side in the direction D and the first segments 21 which are adjacent to each other on the other side in the direction D with respect to the corresponding first segments 21 can be enhanced by providing the diffuse reflection regions. In addition, the index V(R)/P(R) was enhanced compared to that of Example 9. From this, it is seen that the characteristic of discrimination between the second segments 31 positioned closest to the one side in the direction D and the second segments 31 which are adjacent to each other on the other side in the direction D with respect to the corresponding second segments 31 can be enhanced by providing the diffuse reflection regions.

Figure 26B:
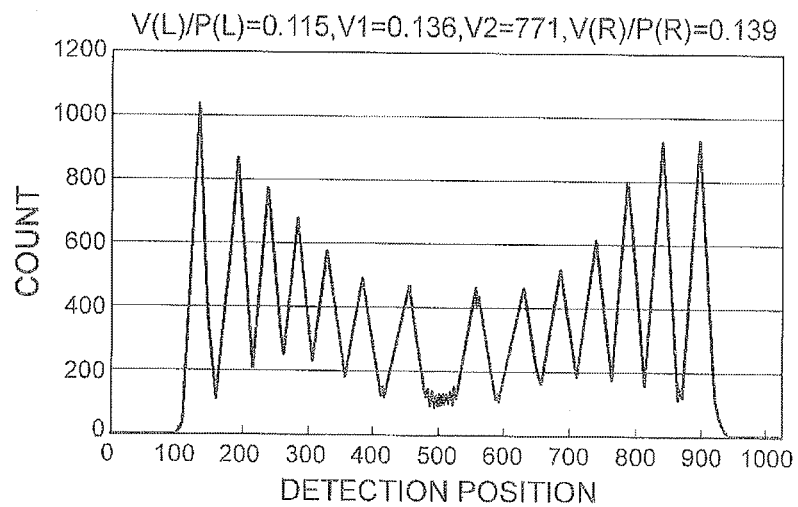
FIG. 26B is a graph showing a histogram of Example 13.

FIG. 26B is a graph showing a histogram of Example 13. In Example 13, as in the above-described embodiment, by roughening the first region 26 and the second region 36 to act as diffuse reflection surfaces, the first region 26 and the second region 36 were allowed to act as the diffuse reflection regions. The other points were the same as those of Example 9. In Example 13, the value of the index V1 was 0.136, and the value of the index V2 was 771, the value of the index V(L)/P(L) was 0.115, and the value of the index V(R)/P(R) was 0.139. As described above, both of the index V1 and the index V2 were enhanced compared to those of Example 9. From this, it is seen that the characteristic of discrimination between segments can be enhanced by providing the diffuse reflection regions. Furthermore, the index V(R)/P(R) was enhanced compared to that of Example 9. From this, it is seen that the characteristic of discrimination between the second segments 31 positioned closest to the one side in the direction D and the second segments 31 which are adjacent to each other on the other side in the direction D with respect to the corresponding second segments 31 can be enhanced by providing the diffuse reflection regions.

Figure 27:
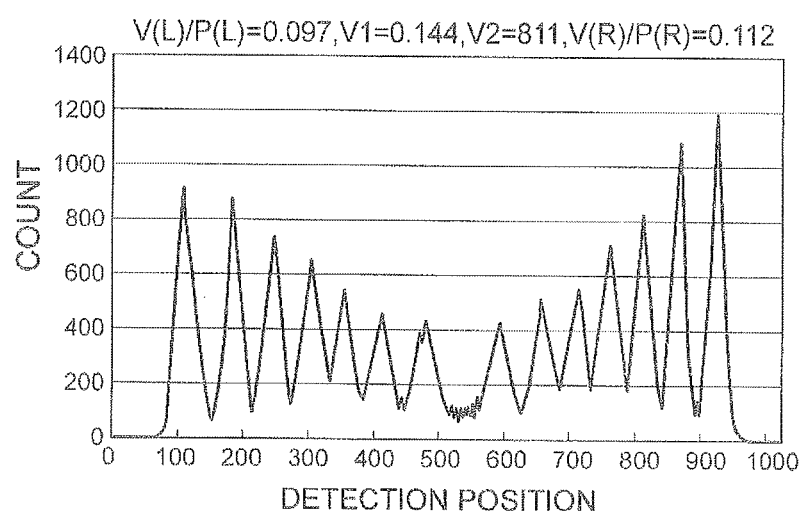
FIG. 27 is a graph showing a histogram of Example 14.

FIG. 27 is a graph showing a histogram of Example 14. In Example 14, as in the fifteenth modification example, the light scattering surface 27 was provided in the first segments 21 positioned closest to the other side in the direction D, and the light scattering surface 38 was provided in the second segments 31 positioned closest to the one side in the direction D. The other points were the same as those of Example 9. In Example 14, the value of the index V1 was 0.144, and the value of the index V2 was 811, the value of the index V(L)/P(L) was 0.097, and the value of the index V(R)/P(R) was 0.112. As described above, both of the index V1 and the index V2 were enhanced compared to those of Example 9. From this, it is seen that the characteristic of discrimination between segments can be enhanced by providing the light scattering surfaces 27 and 37. Furthermore, the index V(L)/P(L) was enhanced compared to that of Example 9. From this, it is seen that the characteristic of discrimination between the first segments 21 positioned closest to the one side in the direction D and the first segments 21 which are adjacent to each other on the other side in the direction D with respect to the corresponding first segments 21 can be enhanced by providing the light scattering surface 27. In addition, the index V(R)/P(R) was enhanced compared to that of Example 9. From this, it is seen that the characteristic of discrimination between the second segments 31 positioned closest to the one side in the direction D and the second segments 31 which are adjacent to each other on the other side in the direction D with respect to the corresponding second segments 31 can be enhanced by providing the light scattering surface 37.

According to an aspect of the present invention, a radiation detector which achieves ease of manufacturing, high accuracy, and ease of mounting on an apparatus can be provided.

What is claimed is:
1. A radiation detector comprising:
 a first scintillator portion including a plurality of first segments arranged along a predetermined direction, and a first light scattering portion formed between the first segments adjacent to each other through laser irradiation;
 a second scintillator portion including a plurality of second segments arranged along the predetermined direction, and a second light scattering portion formed between the second segments adjacent to each other through laser irradiation; and
 a light detection unit optically connected to a first end surface of the first segment positioned closest to one side in the predetermined direction, and a second end surface of the second segment positioned closest to the one side in the predetermined direction,
 wherein the first segment positioned closest to the other side in the predetermined direction and the second segment positioned closest to the other side in the predetermined direction are optically connected to each other,
 the first segments other than the first segment positioned closest to the other side in the predetermined direction and the second segments other than the second segment positioned closest to the other side in the predetermined direction are optically separated from each other, and
 the first scintillator portion and the second scintillator portion are arranged along a direction perpendicular to the predetermined direction.

2. The radiation detector according to claim 1, further comprising:
 a light reflection portion disposed between the first segments other than the first segment positioned closest to the other side in the predetermined direction and the second segments other than the second segment positioned closest to the other side in the predetermined direction.

3. The radiation detector according to claim 1,
 wherein a plurality of radiation detection units, each of which includes the first scintillator portion, the second scintillator portion, and the light detection unit, are configured,
 the light detection unit includes a first light detection portion optically connected to the first end surface, and a second light detection portion optically connected to the second end surface, and
 the first light detection portion of each of the plurality of radiation detection units is connected to a first resistor chain, and the second light detection portion of each of the plurality of radiation detection units is connected to a second resistor chain.

4. The radiation detector according to claim 1,
 wherein, in a case where the first segment positioned closest to the other side in the predetermined direction and the second segment positioned closest to the other side in the predetermined direction are optically coupled to each other, a light guide portion which optically connects the first segment and the second segment to each other is further included.

5. The radiation detector according to claim 1,
 wherein a first region including at least a portion of a surface of the first segment positioned closest to the one side in the predetermined direction excluding the first end surface, and a second region including at least a portion of a surface of the second segment positioned closest to the one side in the predetermined direction excluding the second end surface are formed as diffuse reflection regions, and a surface of the plurality of first segments other than the first end surface and the first region, and a surface of the plurality of second segments other than the second end surface and the second region are formed as specular reflection regions.

\* \* \* \* \*